(12) United States Patent
Gupta et al.

(10) Patent No.: US 9,840,254 B2
(45) Date of Patent: Dec. 12, 2017

(54) METHOD AND SYSTEM FOR ADAPTIVE DETECTION AND APPLICATION OF HORN FOR AN AUTONOMOUS VEHICLE

(71) Applicant: SONY CORPORATION, Tokyo (JP)

(72) Inventors: Manish Gupta, Bengaluru (IN); Khushwant Peswani, Bengaluru (IN); Ramesha Chelur Ramachandra Sastry, Bengaluru (IN); Pramod Chintalapoodi, San Diego, CA (US); Sho Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 64 days.

(21) Appl. No.: 14/986,140

(22) Filed: Dec. 31, 2015

(65) Prior Publication Data

US 2017/0190331 A1 Jul. 6, 2017

(51) Int. Cl.
*B60W 30/09* (2012.01)
*B60W 30/18* (2012.01)
*B60W 10/18* (2012.01)
*B60W 10/20* (2006.01)
*B60W 10/04* (2006.01)
(Continued)

(52) U.S. Cl.
CPC ............ *B60W 30/18* (2013.01); *B60Q 1/346* (2013.01); *B60Q 5/005* (2013.01); *B60W 10/04* (2013.01); *B60W 10/18* (2013.01); *B60W 10/20* (2013.01); *B60W 30/18163* (2013.01); *G05D 1/0088* (2013.01); *G07C 5/02* (2013.01); *G07C 5/0816* (2013.01); *B60W 2520/10* (2013.01); *B60W 2520/14* (2013.01); *B60W 2540/18* (2013.01); *B60W 2550/00* (2013.01); *B60W 2550/20* (2013.01); *B60W 2710/18* (2013.01);
(Continued)

(58) Field of Classification Search
None
See application file for complete search history.

(56) References Cited

U.S. PATENT DOCUMENTS

| | | | |
|---|---|---|---|
| 8,457,827 B1 | 6/2013 | Ferguson et al. | |
| 8,676,427 B1 * | 3/2014 | Ferguson .............. | B60W 30/00 701/23 |

(Continued)

OTHER PUBLICATIONS

Hong Cheng et al, "Interactive Road Situation Analysis for Driver Assistance and Safety Warning Systems: Framework and Algorithms", IEEE Transactions on Intelligent Transportation Systems, Mar. 2007, p. 11, vol. 8, Issue:1, IEEE.

*Primary Examiner* — Ryan Rink
(74) *Attorney, Agent, or Firm* — Chip Law Group

(57) ABSTRACT

Various aspects of a system and method for an autonomous vehicle, based on detection and/or application of horn, are disclosed herein. The system comprises one or more circuits in an electronic control unit (ECU) used in a first vehicle. The one or more circuits in the ECU are configured to detect a horn sound emanated from a second vehicle. First sensor data associated with the first vehicle is captured based on the detected horn sound. The captured first sensor data indicates a first traffic scenario in a vicinity of the first vehicle. Second sensor data associated with the first vehicle is captured for an elapsed time interval prior to the detection of the horn sound. One or more control systems in the first vehicle are recalibrated to perform one or more functions associated with the first vehicle. The recalibration is based on the captured first sensor data and the extracted second sensor data.

20 Claims, 10 Drawing Sheets

(51) Int. Cl.
*B60Q 1/34* (2006.01)
*B60Q 5/00* (2006.01)
*G07C 5/02* (2006.01)
*G07C 5/08* (2006.01)
*G05D 1/00* (2006.01)

(52) U.S. Cl.
CPC ..... *B60W 2710/20* (2013.01); *B60W 2720/10* (2013.01); *B60W 2900/00* (2013.01)

(56) References Cited

U.S. PATENT DOCUMENTS

| | | | |
|---|---|---|---|
| 9,297,663 B1* | 3/2016 | Golding | G01C 21/3484 |
| 9,666,067 B1* | 5/2017 | Nagpal | G08G 1/056 |
| 2009/0179774 A1* | 7/2009 | Mohan | G08G 1/0962 |
| | | | 340/902 |
| 2014/0195071 A1 | 7/2014 | Hunt | |
| 2014/0236414 A1* | 8/2014 | Droz | B60W 30/00 |
| | | | 701/28 |
| 2015/0309512 A1* | 10/2015 | Cudak | G05D 1/0287 |
| | | | 701/23 |
| 2016/0167648 A1* | 6/2016 | James | B60W 30/09 |
| | | | 701/28 |
| 2016/0225095 A1* | 8/2016 | Biemer | G06Q 40/08 |
| 2016/0286156 A1* | 9/2016 | Kovac | H04N 5/772 |
| 2016/0304097 A1* | 10/2016 | Taira | B60W 30/18163 |
| 2016/0316179 A1* | 10/2016 | Plante | G06F 9/4443 |

* cited by examiner

METHOD AND SYSTEM FOR ADAPTIVE DETECTION AND APPLICATION OF HORN FOR AN AUTONOMOUS VEHICLE

CROSS-REFERENCE TO RELATED APPLICATIONS/INCORPORATION BY REFERENCE

None.

FIELD

Various embodiments of the disclosure relate to a system and method for an autonomous vehicle. More specifically, various embodiments of the disclosure relate to a system and method for an autonomous vehicle based on detection and/or application of a horn.

BACKGROUND

Autonomous vehicle technology and/or Advanced Driving Assisting System (ADAS) are currently at a nascent stage. Various experiments are conducted related to the development of autonomous vehicle technology and/or the ADAS for use in vehicles, such as cars. Currently, vehicles with the ADAS are launched and several autonomous vehicles or working prototypes are undergoing the testing stage.

In a scenario, a driver may observe an error in the operation of the autonomous vehicle or a vehicle with the ADAS including an autonomous braking system, a function of lane departure warning, and/or an autonomous cruise control system, etc. However, it may not always be possible for the driver to understand the problem accurately and utilize the related data. In another scenario, another vehicle user may honk at the autonomous vehicle or the vehicle with the ADAS for the improper driving. It may be desirable that machine learning is appropriately performed by the system of the autonomous vehicle or vehicle with the ADAS to rectify the improper driving for subsequent driving scenarios. In yet another scenario, it may be difficult for other road users to understand if they are the cause of some obstruction to the autonomous vehicle or vehicle with the ADAS on the road. Thus, an advanced, yet simplified technology may be required to improve the function and adaptability of the autonomous vehicle or vehicle with the ADAS.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for an autonomous vehicle, based on detection and/or application of a horn, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
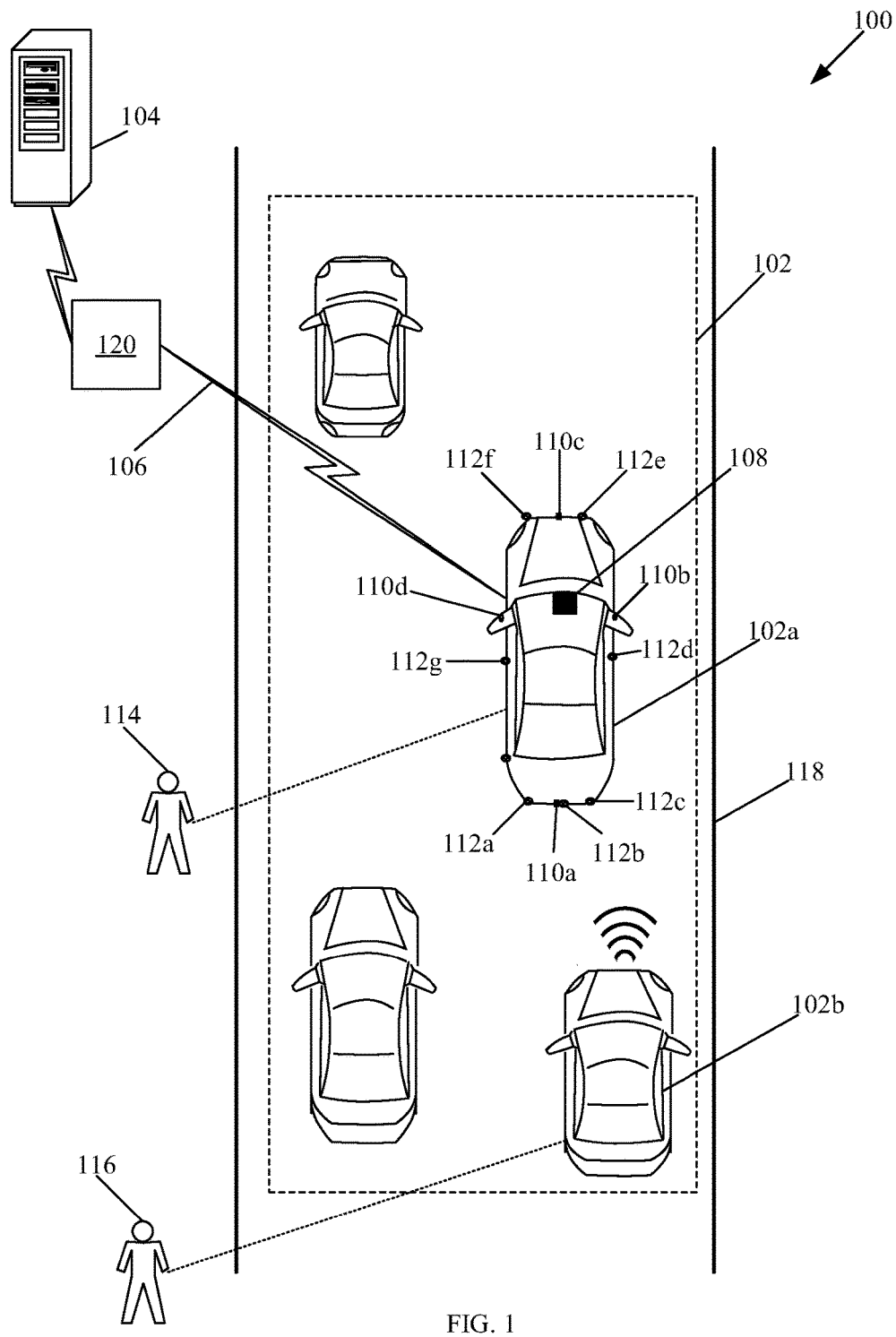
FIG. 1 is a block diagram that illustrates a network environment for an autonomous vehicle, in accordance with an embodiment of the disclosure.

The following described implementations may be found in the disclosed system and method for an autonomous vehicle, based on detection and/or application of a horn. Exemplary aspects of the disclosure may comprise a method that may detect a horn sound emanated from a second vehicle. First sensor data associated with the first vehicle may be captured based on the detected horn sound. The captured first sensor data may indicate a first traffic scenario in a vicinity of the first vehicle. Second sensor data associated with the first vehicle may be extracted for an elapsed time interval prior to the detection of the horn sound. One or more control systems in the first vehicle may be recalibrated to perform one or more functions associated with the first vehicle. The recalibration may be based on the captured first sensor data and the extracted second sensor data.

In accordance with an embodiment, the first vehicle and the second vehicle may operate in an autonomous mode, a semi-autonomous mode, or a manual mode. A position and/or a direction of the second vehicle may be determined with respect to the first vehicle, based on the captured first sensor data.

In accordance with an embodiment, the one or more functions may correspond to a change of lane, a change of speed, provision of lane change indication, and/or maintenance of a safe distance from one or more other vehicles. The one or more functions may further correspond to an application of a horn, an application of brakes, change in driving path of the first vehicle, generation of a safety alert, and/or performance of the one or more functions to avoid a violation of a traffic regulation.

In accordance with an embodiment, the first sensor data may correspond to a video stream of the first traffic scenario, vehicle data received from one or more connected vehicles in the vicinity of the first vehicle, and/or sensor data received from a radio wave-based object detection device or a laser-based object detection device. The second sensor data may correspond to a steering angle, a yaw rate, a speed value, lane information, a vehicle position accuracy data, a brake system status, a status of a vehicle stability system, and/or a rate-of-change of speed of the first vehicle.

In accordance with an embodiment, the captured first sensor data and the extracted second sensor data may be tagged with metadata that corresponds to the detection of the horn sound. The tagged first sensor data and the second sensor data may be utilized for the recalibration of the one or more control systems of the first vehicle. In accordance with an embodiment, the first traffic scenario may be identified for an automatic application of a horn by the first vehicle when the first vehicle is operated in an autonomous mode.

In accordance with another aspect of the disclosure, another method may comprise detection of an application of a horn at the first vehicle. The first sensor data associated with the first vehicle may be captured based on the detected application of the horn. The captured first sensor data may indicate a first traffic scenario in a vicinity of the first vehicle. Second sensor data associated with the first vehicle may be extracted for an elapsed time interval prior to the application of the horn at the first vehicle. One or more control systems in the first vehicle may be recalibrated to perform one or more functions associated with the first vehicle based on the captured first sensor data and the extracted second sensor data.

In accordance with an embodiment, the captured first sensor data and the extracted second sensor data may be tagged with metadata that corresponds to the application of the horn at the first vehicle. The recalibration of the one or more control systems in the first vehicle may be further based on the tagged first sensor data and extracted second sensor data when the application of the horn at the first vehicle is detected.

FIG. 1 is a block diagram that illustrates a network environment for an autonomous vehicle, in accordance with an embodiment of the disclosure. With reference to FIG. 1, there is shown a network environment 100. The network environment 100 may include a plurality of vehicles 102, such as a first vehicle 102a and a second vehicle 102b. The network environment 100 may further include a cloud server 104, a wireless communication network 106, and one or more users. There is further shown an electronic control unit (ECU) 108, image-capturing units 110a to 110d, and sound sensors 112a to 112g in the first vehicle 102a. The one or more users may include a driver 114 associated with the first vehicle 102a, and another driver 116 associated with the second vehicle 102b. The plurality of vehicles 102, which include the first vehicle 102a and the second vehicle 102b, may traverse along a road portion 118. There is further shown a road side unit (RSU) 120.

The ECU 108 may be communicatively coupled to the image-capturing units 110a to 110d and the sound sensors 112a to 112g, directly or indirectly via an in-vehicle network. In accordance with an embodiment, the ECU 108 may be communicatively coupled to the cloud server 104, by communicating with the RSU 120 via the wireless communication network 106. The RSU 120 may communicate with the cloud server 104 via the Internet or a suitable communication protocol known in the art.

The plurality of vehicles 102 may include the first vehicle 102a, the second vehicle 102b, and other vehicles that may traverse along the road portion 118. In accordance with an embodiment, the plurality of vehicles 102 may be communicatively coupled to the wireless communication network 106. The plurality of vehicles 102 may be configured to communicate vehicle data to the first vehicle 102a. In accordance with an embodiment, the wireless communication network 106 may be used for a vehicle to vehicle (V2V) communication among the plurality of vehicles 102. The wireless communication network 106 may also be used for a vehicle to infrastructure (V2I) communication between one of the plurality of vehicles 102 and the RSU 120.

The first vehicle 102a may refer to an autonomous vehicle that may operate in an autonomous mode, a semi-autonomous mode, or a manual mode. The first vehicle 102a may comprise the ECU 108, which may be configured to communicate with the cloud server 104, and/or one or more other vehicles of the plurality of vehicles 102, via the wireless communication network 106. The second vehicle 102b may refer to a non-autonomous vehicle or a vehicle that may operate in an autonomous mode, a semi-autonomous mode, or a manual mode. Examples of the plurality of vehicles 102 (which include the first vehicle 102a and the second vehicle 102b) may include, but are not limited to, a motor vehicle, a hybrid vehicle, and/or a vehicle that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. For example, the National Highway Traffic Safety Administration (NHTSA) in the United States proposes a classification for driving system as follows. The system and method of the present disclosure may be applied for vehicles with an autonomous function such as autonomous braking, autonomous cruise control, autonomous driving, etc. In the following examples, the system and method of the present disclosure may also be applied for vehicles from Level 1 to Level 4. According to the NHTSA, in "Level 0" category of vehicles, the driver completely controls the vehicle at all times. In "Level 1" category, individual vehicle controls may be automated, such as electronic stability control or automatic braking. In "Level 2" category, at least two controls may be automated together simultaneously, such as an adaptive cruise control together with a lane keeping control. In "Level 3" category, the level of autonomous control increases, where a vehicle may perform safety-critical functions in certain conditions. The vehicle may sense when conditions require the driver to retake control and provides a "sufficiently comfortable transition time" for the driver to do so. In "Level 4" category, the vehicle may perform all safety-critical functions where the driver is not expected to control the vehicle at any time. As this category of vehicle may control all functions from start to stop, including all parking functions, it may be a driverless vehicle.

The cloud server 104 may comprise suitable logic, circuitry, interfaces, and/or code that may be configured to establish a communication channel with one or more vehicles, such as the first vehicle 102a. The cloud server 104 may be configured to store information received from one or more autonomous vehicles, such as the first vehicle 102a. The cloud server 104 may be a web server, a database server, a file server, an application server, a cloud-based server, or a combination thereof. The cloud server 104 may be implemented by use of several technologies that are well known to those skilled in the art.

The wireless communication network 106 may include a medium through which the first vehicle 102a may communicate with the cloud server 104, and/or one or more other vehicles, such as the second vehicle 102b. Examples of the wireless communication network 106 may include, but are not limited to, a dedicated short-range communication (DSRC) network, a mobile ad-hoc network (MANET), a vehicular ad-hoc network (VANET), Intelligent vehicular ad-hoc network (InVANET), Internet based mobile ad-hoc networks (IMANET), a wireless sensor network (WSN), a wireless mesh network (WMN), the Internet, a cellular network, such as a long-term evolution (LTE) network, a cloud network, a Wireless Fidelity (Wi-Fi) network, and/or a Wireless Local Area Network (WLAN). Various devices in the network environment 100 may be operable to connect to the wireless communication network 106, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, infrared (IR), and/or Bluetooth (BT) communication protocols.

The ECU 108 may comprise suitable logic, circuitry, interfaces, and/or code that may be configured to detect that a horn sound is emanated from one or more of the plurality of vehicles 102, such as the second vehicle 102b. The ECU 108 may be a test ECU that may help improve the drive accuracy of the first vehicle 102a on a road, such as the road portion 118, when the first vehicle 102a is in an autonomous mode. The ECU 108 may be configured to access sensor data of the first vehicle 102a, or to communicate one or more control commands to other ECUs, components, or systems of the first vehicle 102a. The sensor data may be accessed by the ECU 108, via an in-vehicle network, such as a controller area network (CAN) bus. In accordance with an embodiment, the ECU 108 may be configured to receive vehicle data from one or more connected vehicles from the plurality of vehicles 102 in a vehicle-to-vehicle (V2V) communication, via a wireless communication system. In accordance with an embodiment, the ECU 108 may be configured to receive vehicle data of one or more connected vehicles from the cloud server 104 in an infrastructure-to-vehicle (I2V) communication. In such a case, the one or more connected vehicles from the plurality of vehicles 102 may communicate corresponding vehicle data to the cloud server 104 beforehand, in a vehicle-to-infrastructure (V2I) communication. One or more horn signals may be communicated between two vehicles, such as the first vehicle 102a and the second vehicle 102b, of the plurality of vehicles 102 via the V2V communication instead of using horn sounds (honking). In this case, the plurality of vehicles 102 have a function of sending and receiving a horn signal via the V2V communication. The first vehicle 102a may receive and detect a horn signal from other vehicles of the plurality of vehicles 102 as a warning information via the V2V communication.

The image-capturing units 110a to 110d may comprise suitable logic, circuitry, interfaces, and/or code that may be configured to capture one or more video streams of a road portion, such as the road portion 118. The video streams may include a plurality of image frames within one or more fields-of-view (FOVs) of the image-capturing units 110a to 110d. The image-capturing units 110a to 110d may be configured to record time of capture of each frame of the plurality of image frames in the captured one or more video streams. Examples of the image-capturing units 110a to 110d may include, but are not limited to, an image sensor, a wide-angle camera, a closed-circuit television (CCTV) camera, a camcorder, an in-built camera of a smart-glass, and/or other such vehicle cameras. In accordance with an embodiment, the image-capturing unit 110a may be installed at the rear side of a vehicle body of the first vehicle 102a. The image-capturing units 110b and 110d may be installed at outside rear view mirrors (ORVM) of the first vehicle 102a (as shown). The image-capturing unit 110c may be installed at the front side of the vehicle body of the first vehicle 102a. In accordance with an embodiment, instead of multiple image-capturing units, such as the image-capturing units 110a to 110d, one rotatable image-capturing unit may be provided that may be configured to capture a 360 degree view of the road portion 118 in the vicinity of the first vehicle 102a.

The sound sensors 112a to 112g may refer to sensors or transducers that convert sound energy into electrical signals. The sound sensors 112a to 112g may be configured to capture horn sound, measure sound pressure, and/or acoustic particle velocity of a sound field, such as a sound wave of horn sound. Horn sound generated by automobiles, such as a four wheeler, a three wheeler, or a two wheeler, may comprise a certain distinct pitch and loudness values. The sound sensors 112a to 112g may comprise audio filters that may be configured to capture sounds (such as horn sounds) in pre-defined range of pitch, loudness, and sound duration such as to filter out other noise on the road portion 118. The sound sensors 112a to 112g may be communicatively coupled to the ECU 108. The sound sensors 112a to 112g may be positioned at one or more locations of the first vehicle 102a, as shown in FIG. 1.

The RSU 120 may be configured to wirelessly communicate to the plurality of vehicles 102 on the road portion 118. The RSU 120 may be further configured to communicate with the cloud server 104 via the Internet, or a suitable communication protocol known in the art. The RSU 120 may correspond to an infrastructure unit or a communication device installed at the road portion 118. In accordance with an embodiment, multiple RSUs similar to the RSU 120 may be installed along the road portion 118 or other road portions.

In operation, the sound sensors 112a to 112g may be configured to capture a horn sound emanated from one of the plurality of vehicles 102. The ECU 108 may be configured to detect the horn sound and/or a direction of the horn sound emanated from one of the plurality of vehicles 102, such as the second vehicle 102b, and captured by the sound sensors 112a to 112g. The ECU 108 may be configured to capture first sensor data associated with the first vehicle 102a, based on the detected horn sound. The captured first sensor data indicates a first traffic scenario in a vicinity of the first vehicle 102a.

In accordance with an embodiment, the captured first sensor data may correspond to a video stream of the first traffic scenario. The video stream may be captured by at least one of the image-capturing units 110a to 110d. The captured first sensor data may further correspond to vehicle data received from one or more connected vehicles in the vicinity of the first vehicle 102a, and/or sensor data received from one or more sensors, such as a radio detection and ranging (RADAR) device, installed at the first vehicle 102a.

In accordance with an embodiment, the ECU 108 may be configured to determine a position and/or a direction of the second vehicle 102b, with respect to the first vehicle 102a, based on the captured first sensor data. The ECU 108 may be further configured to extract second sensor data associated with the first vehicle 102a. The second sensor data may be extracted for an elapsed time interval prior to the detection of the horn sound. The second sensor data may correspond to in-vehicle data, such as a steering angle, a yaw rate, a speed value, lane information, and/or a rate-of-change of speed, associated with the first vehicle 102a.

In accordance with an embodiment, the ECU 108 may be configured to tag the captured first sensor data and the extracted second sensor data with metadata. The metadata may correspond to the detection of the horn sound. The ECU 108 may be configured to recalibrate one or more control systems in the first vehicle 102a, to perform one or more functions associated with the first vehicle 102a. The recalibration of the one or more control systems in the first vehicle 102a may be based on the captured and tagged first sensor data and the extracted second sensor data.

In accordance with an embodiment, the one or more functions may correspond to a change of lane, a change of speed, provision of lane change indication, maintenance of a safe distance from one or more other vehicles, an application of a horn, and/or an application of brakes at first vehicle 102a. The one or more functions may further correspond to a change in driving path of the first vehicle 102a and generation of a safety alert via a display unit and/or the audio interface (described in detail in FIG. 2). In accordance with an embodiment, the one or more functions may be performed to avoid violation of a traffic regulation.

In accordance with an embodiment, the tagged first sensor data and the second sensor data may be communicated to the cloud server 104. The cloud server 104 may be configured to store the tagged first sensor data and the second sensor data. The cloud server 104 may be further configured to analyze the tagged first sensor data and the second sensor data. The analysis may be performed to determine events around the time of detection of the horn sound and/or to determine a relationship between the second sensor data and the captured first sensor data.

In accordance with an embodiment, the cloud server 104 may store learned data, such as the tagged second sensor data, in an associative relationship with the first sensor data. The cloud server 104 may be configured to communicate the learned data to the ECU 108 of the first vehicle 102a, so that when a similar traffic scenario, such as the first traffic scenario, is encountered in future by the first vehicle 102a, the first vehicle 102a may automatically perform the one or more functions, as described above.

Although for simplicity, FIG. 1 does not show a roadside unit (RSU), one skilled in the art may appreciate that the captured first sensor data and the second sensor data may also be communicated to the RSU for storage and analysis, via the wireless communication network 106. The analysis result may be communicated to other vehicles, such as the first vehicle 102a and/or the second vehicle 102b, to improve the drive in autonomous mode. The operations performed at the ECU 108 of the first vehicle 102a are further described in detail in FIGS. 2, 3A, 3B, 4A, and 4B.

Figure 2:
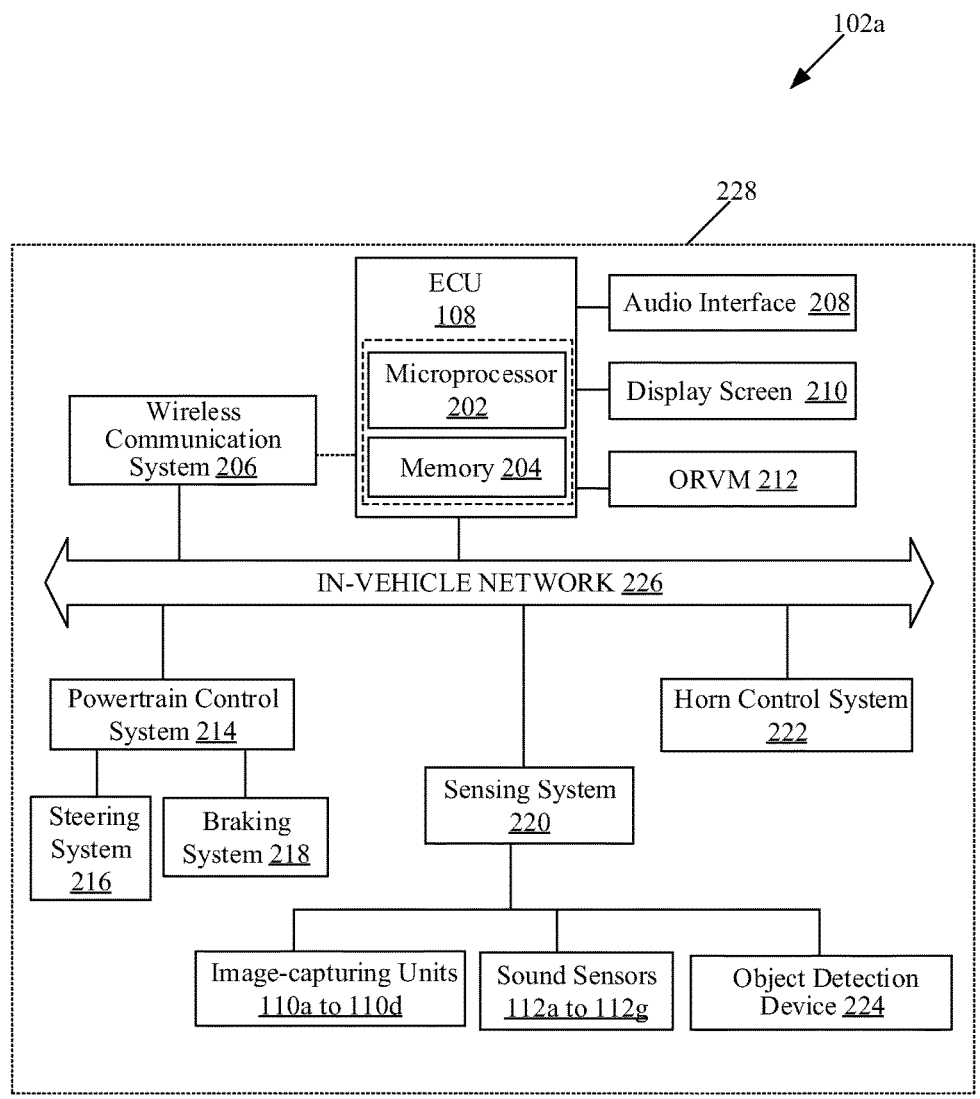
FIG. 2 is a block diagram that illustrates various exemplary components or systems of an autonomous vehicle, in accordance with an embodiment of the disclosure.

FIG. 2 is a block diagram that illustrates various exemplary components or systems of an autonomous vehicle, in accordance with an embodiment of the disclosure. FIG. 2 is explained in conjunction with elements from FIG. 1. With reference to FIG. 2, there is shown the first vehicle 102a. The first vehicle 102a may comprise the ECU 108 that may include a microprocessor 202 and a memory 204. The first vehicle 102a may further comprise a wireless communication system 206, an audio interface 208, a display screen 210, an outside rear view mirror (ORVM) 212, a powertrain control system 214, a steering system 216, a braking system 218, a sensing system 220, a horn control system 222, an object detection device 224, an in-vehicle network 226, and a vehicle body 228. The sensing system 220 may include one or more image-capturing units, such as the image-capturing units 110a to 110d, the sound sensors 112a to 112g, and the object detection device 224.

The various components or systems may be communicatively coupled to each other, via the in-vehicle network 226, such as a vehicle area network (VAN), and/or an in-vehicle data bus. The microprocessor 202 may be communicatively coupled to the memory 204, the audio interface 208, the display screen 210, the ORVM 212, the wireless communication system 206, the powertrain control system 214, the sensing system 220, and the horn control system 222, via the in-vehicle network 226. It should be understood that the first vehicle 102a may also include other suitable components or systems, but for brevity, those components or systems which are used to describe and explain the function and operation of the present disclosure are illustrated herein.

The microprocessor 202 may comprise suitable logic, circuitry, interfaces, and/or code that may be configured to execute a set of instructions stored in the memory 204. Examples of the microprocessor 202 may be an X86-based processor, a Reduced Instruction Set Computing (RISC) processor, an Application-Specific Integrated Circuit (ASIC) processor, a Complex Instruction Set Computing (CISC) processor, an Explicitly Parallel Instruction Computing (EPIC) processor, a Very Long Instruction Word (VLIW) processor, a microcontroller, a central processing unit (CPU), a graphics processing unit (GPU), a state machine, and/or other processors or circuits.

The memory 204 may comprise suitable logic, circuitry, and/or interfaces that may be configured to store a machine code and/or a set of instructions with at least one code section executable by the microprocessor 202. The memory 204 may be further operable to store the tagged first sensor data and the second sensor data. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The wireless communication system 206 may comprise suitable logic, circuitry, interfaces, and/or code that may be configured to communicate with one or more external devices, such as the cloud server 104, under the control of the microprocessor 202. Such communication with the one or more external devices may occur by use of the wireless communication network 106. The wireless communication system 206 may include various components, which are not limited to, an antenna, a telematics unit, a radio frequency (RF) transceiver, one or more amplifiers, one or more oscillators, a digital signal processor, a near field communication (NFC) circuitry, a coder-decoder (CODEC) chipset, and/or a subscriber identity module (SIM) card.

The wireless communication system 206 may communicate with networks, such as the wireless communication network 106 under the control of the microprocessor 202, via a wireless communication protocol, such as a dedicated short-range communication (DSRC) protocol. The wireless communication system 206 may use any of a plurality of communication standards, protocols and technologies, such as the global system for mobile communications (GSM), enhanced data GSM environment (EDGE), wideband code division multiple access (W-CDMA), code division multiple access (CDMA), long term evolution (LTE), time division multiple access (TDMA), Bluetooth (BT), Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The audio interface 208 may be connected to a speaker, a chime, a buzzer, or other device that may be operable to generate a sound. The audio interface 208 may also be connected to a microphone or other device to receive a voice input from an occupant of the first vehicle 102a, such as the driver 114. The display screen 210 may refer to a touch screen to receive an input from the driver 114 and to display various types of information to occupants of the first vehicle 102a, such as the driver 114. The first vehicle 102a may include other input/output (I/O) devices that may be configured to communicate with the microprocessor 202. The audio interface 208 may be a part of an infotainment unit or a head unit of the first vehicle 102a. In accordance with an embodiment, in-vehicle communication of audio/video data for multimedia components may occur by use of Media Oriented Systems Transport (MOST) multimedia network protocol of the in-vehicle network 226. Examples of the display screen 210 may include, but are not limited to, a display of the head unit, a tablet computer, a computing device with an electronic display, a heads-up display (HUD), a heads-up display with an augmented reality system (AR-HUD), a driver information console (DIC), a projection-based display, a see-through display, a smart-glass display, and/or an electro-chromic display. In accordance with an embodiment, the image-capturing units 110b and 110d may be installed at the ORVM 212 of the first vehicle 102a (as shown in FIG. 1).

The powertrain control system 214 may refer to an onboard computer of the first vehicle 102a that controls operations of an engine and a transmission system of the first vehicle 102a. The powertrain control system 214 may control the engine's ignition, fuel injection, emission systems, and/or operations of the transmission system (such as automatic transmission system) and the braking system 218. The transmission system may refer to a manual transmission, a synchronized transmission, a fully automatic transmission, a semi-automatic transmission, a Continuously Variable Transmission (CVT), a sequential transmission, dual-clutch transmission (DCT), or other transmission known in the art.

The steering system 216 may be associated with the powertrain control system 214. The steering system 216 may include a steering wheel and/or an electric motor (provided for a power-assisted steering) that may be used by the driver 114 to control movement of the first vehicle 102a in manual mode or a semi-autonomous mode. In accordance with an embodiment, the movement or steering of the first vehicle 102a may be automatically controlled when the first vehicle 102a is in autonomous mode. Examples of the steering system 216 may include, but are not limited to, an autonomous steering control, a power-assisted steering system, a vacuum/hydraulic-based steering system, an electro-hydraulic power-assisted system (EHPAS), or a "steer-by-wire" system, known in the art.

The braking system 218 may be used to stop or slow down the first vehicle 102a by application of frictional forces. The braking system 218 may be configured to receive a command from the powertrain control system 214 under the control of the microprocessor 202, when the first vehicle 102a is in an autonomous mode or a semi-autonomous mode.

The sensing system 220 may comprise the image-capturing units 110a to 110d, the sound sensors 112a to 112g, the object detection device 224, and/or one or more other vehicle sensors provided in the first vehicle 102a. The sensing system 220 may be operatively connected to the ECU 108, via the in-vehicle network 226, to provide input signals to the microprocessor 202. One or more communication interfaces, such as a CAN interface, may be provided in the sensing system 220 to connect to the in-vehicle network 226. The object detection device 224 may be the RADAR device and/or a laser-based object detection sensor, such as a light detection and ranging (LIDAR) device. Examples of the one or more vehicle sensors of the sensing system 220 may include, but are not limited to, a vehicle speed sensor, the odometric sensors, a yaw rate sensor, a speedometer, a global positioning system (GPS), a steering angle detection sensor, a vehicle travel direction detection sensor, a magnometer, an image sensor, a touch sensor, and/or an infrared sensor. The one or more vehicle sensors of the sensing system 220 may be configured to detect a direction of travel, geospatial position, steering angle, yaw rate, speed, and/or rate-of-change of speed of the first vehicle 102a.

The horn control system 222 may be communicatively coupled to the ECU 108 via the in-vehicle network 226. The horn control system 222 may be configured to automatically apply the horn based on a command received from the microprocessor 202 when the first vehicle 102a is in the autonomous mode. The horn control system 222 may be connected to a horn switch (not shown) that may receive input from a user, such as the driver 114, for application of the horn in the first vehicle 102a in a manual mode or semi-autonomous mode. When the horn switch is pressed, a horn signal may be relayed to the horn via the in-vehicle network 226. The horn may refer to an automobile horn used to produce a sound to alarm others (usually referred to as honking) while driving on a road, such as the road portion.

The in-vehicle network 226 may include a medium through which the various components or systems of the first vehicle 102a, such as the ECU 108, the horn control system 222, the powertrain control system 214, the sensing system 220, and/or the wireless communication system 206, may communicate with each other. The in-vehicle network 226 may facilitate access control and/or communication between the microprocessor 202 and other ECUs, such as the horn control system 222 or a body control module, of the first vehicle 102a. Various devices in the first vehicle 102a may be configured to connect to the in-vehicle network, in accordance with various wired and wireless communication protocols. One or more communication interfaces, such as the CAN interface, a Local Interconnect Network (LIN) interface, a Media Oriented Systems Transport (MOST) interface, may be used by the various components or systems of the first vehicle 102a to connect to the in-vehicle network 226. Examples of the wired and wireless communication protocols for the in-vehicle network may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The vehicle body 228 may refer to an outer shell (such as outer panels and/or a frame assembly other than chassis) of the first vehicle 102a, which cover the various components and systems as described above, and other mechanical and electrical workings or components of a vehicle, such as the first vehicle 102a. A body type of the vehicle body 228 may be a unitized body (or a uni-body), a body-on-frame, a body with ancillary sub-frames, a dual frame body, and/or other body structures known in the art. A body style of the vehicle body 228 may be a sports utility vehicle (SUV), a van, a truck, a sedan, a coupe, a convertible, a hatchback, a sports car, and/or other body styles known in the art.

In operation, one or more of the plurality of vehicles 102 may apply a horn in one or more traffic scenarios at the road portion 118. For example, when a driver, such as the driver 116, of the second vehicle 102b observes an improper driving or a mistake in the driving of an autonomous vehicle, such as the first vehicle 102a, the driver 116 (of second vehicle 102b) may apply the horn to alarm the first vehicle 102a. Consequently, a horn sound may emanate from a horn (not shown) of the second vehicle 102b.

In accordance with an embodiment, the sound sensors 112a to 112g may be configured to capture the horn sound emanated from one of the plurality of vehicles 102, such as the second vehicle 102b. The microprocessor 202 may be configured to ascertain whether the captured horn sound is a horn sound emanated from the horn of the first vehicle 102a or other vehicles, such as the second vehicle 102b, of the plurality of vehicles 102. In such a case, the microprocessor 202 of the first vehicle 102a may check presence of a horn signal for self-application of the horn, in the in-vehicle network 226, such as the CAN bus.

In instances when the horn signal is not found in the in-vehicle network 226, the microprocessor 202 may be configured to detect that the horn sound captured by the sound sensors 112a to 112g is emanated by one of the plurality of vehicles 102, such as the second vehicle 102b, in the vicinity of the first vehicle 102a. The microprocessor 202 may be configured to determine a direction of the horn sound by use of the sound sensors 112a to 112g. For example, a time difference of arrival (TDOA) method, a triangulation method, and/or measurement of the acoustic particle velocity of a sound field, such as the sound field of the emanated horn sound, may be employed for the determination of the direction of the horn sound.

In accordance with an embodiment, the microprocessor 202 may be configured to capture first sensor data associated with the first vehicle 102a, based on the detected horn sound. The captured first sensor data indicates a first traffic scenario in a vicinity of the first vehicle 102a. The first traffic scenario may correspond to occurrence of events on a road, such as the road portion 118, for a certain time interval (such as "up to 20 seconds"), at the time of detection of the horn sound. The events may refer to a change in speed, a change of lane, a change in driving path, and/or a relative position of the plurality of vehicles 102 in the vicinity of the first vehicle 102a. The events may also refer to a presence or sudden appearance of pedestrians, an animal, and/or other obstacles on the road portion 118. The events may further refer to a sudden acceleration or deceleration by one or more vehicles in the vicinity of the first vehicle 102a on the road portion 118. The events may further refer to the sudden application of brakes and/or disobedience of traffic rules related to one or more of the plurality of the vehicles 102. The events may lead to a certain traffic scenario, such as the first traffic scenario, on the road portion 118, due to which one or more of the plurality of vehicles 102 may apply the horn.

In accordance with an embodiment, the first traffic scenario may correspond to a current traffic scenario in the vicinity of the first vehicle 102a that may prompt the first vehicle 102a to receive a horn from at least one of the plurality of vehicles 102. In accordance with an embodiment, the first traffic scenario may correspond to a traffic scenario in the vicinity of the first vehicle 102a that may prompt the first vehicle 102a to apply a horn for at least one of the plurality of vehicles 102. Examples of the first traffic scenario may be an abrupt lane change, a lane change without indication, a sudden deceleration, a sudden or slow acceleration, incorrect lane driving, violation of lane markings, non-maintenance of proper distance between vehicles, incorrect driving speed, and/or other traffic scenarios that may be related to violation of traffic rules.

In accordance with an embodiment, the captured first sensor data may correspond to a video stream of the first traffic scenario. The microprocessor 202 may be configured to check whether at least one of the image-capturing units 110a to 110d is "ON". Accordingly, the microprocessor 202 may capture the video stream at least in the determined direction of the horn sound. In certain instances, none of the image-capturing units 110a to 110d may capture the video stream in the determined direction of the horn sound. In such instances, the microprocessor 202 may be configured to switch "ON" or suitably rotate an image-capturing unit, such as the image-capturing unit 110a or the image-capturing unit 110b, to capture the video stream in the determined direction of the horn sound.

In accordance with an embodiment, the captured first sensor data may correspond to vehicle data received from one or more connected vehicles in the vicinity of the first vehicle 102a. For example, the second vehicle 102b, and one or more other vehicles of the plurality of vehicles 102, may be communicatively coupled to the microprocessor 202 of the first vehicle 102a. The communicative coupling may occur when the one or more other vehicles of the plurality of vehicles 102 pass along the road portion 118 and are within the range of the wireless communication network 106, such as the DSRC channels. The second vehicle 102b and one or more other vehicles of the plurality of vehicles 102 may communicate corresponding vehicle data to the microprocessor 202, via the wireless communication network 106. For example, the microprocessor 202 may receive vehicle data of the second vehicle 102b, via the wireless communication system 206. The vehicle data received from the second vehicle 102b may include a unique vehicle identifier, a vehicle position, a vehicle size, a direction of travel, and/or a vehicle speed value of the second vehicle 102b. The received vehicle data may further include a steering angle, a vehicle positional accuracy data, a brake system status, a status of a vehicle stability system, a yaw rate, a rate-of-change of speed, lane information, and/or other vehicle parameters of the second vehicle 102b.

In accordance with an embodiment, the vehicle data received from one or more connected vehicles (of the plurality of vehicles 102) in the vicinity of the first vehicle 102a, may also include information related to application of a horn (if any). For example, when the second vehicle 102b applies the horn for the first vehicle 102a, the vehicle data received from the second vehicle 102b may also include a horn application signal. The vehicle data received from the second vehicle 102b may be used to validate the determination of the direction of the horn sound. This may increase the accuracy of the determination of the direction of the horn sound and further enable identification of the vehicle that applied the horn.

In accordance with an embodiment, the captured first sensor data may correspond to sensor data received from the object detection device 224, such as RADAR or LIDAR, of the sensing system 220. For example, the microprocessor 202 may calculate distance, speed, and/or angle between the first vehicle 102*a* and other vehicles of the plurality of vehicles 102. The calculation of the distance, speed, and/or angle may occur by use of sensor data received from the object detection device 224. For example, relative speed, linear distance, lateral distance, and/or an angle between the first vehicle 102*a* and the second vehicle 102*b* may be calculated at the time of detection of the horn sound.

In accordance with an embodiment, the microprocessor 202 may be configured to determine a position and/or a direction of the second vehicle 102*b*, with respect to the first vehicle 102*a*, based on the captured first sensor data. In an instance, it may not be possible for the driver 114 of the first vehicle 102*a* to determine the reason of the application of the horn by the second vehicle 102*b*. Further, it may also be difficult to log data related to the detection of the horn for future use. Hence, it may be important to understand various aspects as described above, such as the position and direction of the vehicle, such as the second vehicle 102*b*, from the perspective of the first vehicle 102*a*, to improve the accuracy of drive of the first vehicle 102*a*. Further, it may also be important to understand the direction of the horn sound, which vehicle of the plurality of vehicles 102 has applied the horn (honked), the state of the traffic scenario (such as the first traffic scenario), from the perspective of the first vehicle 102*a*.

In accordance with an embodiment, the microprocessor 202 may be configured to extract second sensor data associated with the first vehicle 102*a*. The second sensor data may be extracted for an elapsed time interval prior to the detection of the horn sound. For example, the second sensor data of the first vehicle 102*a* may be extracted for the "last 10 seconds" before the detection of the horn sound to understand and improve the accuracy of the drive of the first vehicle 102*a*. The second sensor data may refer to in-vehicle data associated with the first vehicle 102*a*, and extracted from the in-vehicle network 226, such as the CAN bus.

In accordance with an embodiment, the second sensor data may be a steering angle, a yaw rate, a speed value, and/or a rate-of-change of speed of the first vehicle 102*a*. The second sensor data may also correspond to a vehicle positional accuracy data, a brake system status, a status of a vehicle stability system, a status of the powertrain control system 214, lane information, and/or other vehicle parameters of the first vehicle 102*a*.

In accordance with an embodiment, the microprocessor 202 may be configured to tag the captured first sensor data and the extracted second sensor data with metadata. The metadata may correspond to the detection of the horn sound. The tagged first sensor data and the second sensor data may be used to understand why the second vehicle 102*b* applied the horn at the first vehicle 102*a*, as described below.

In accordance with an embodiment, the microprocessor 202 may be configured to analyze the tagged first sensor data and the second sensor data extracted for the elapsed time interval, such as "last 10 seconds", prior to the detection of the horn sound. The tagged first sensor data and the second sensor data are analyzed to determine the events that caused a particular traffic scenario in the vicinity of the first vehicle 102*a*, around the time of detection of the horn sound by the microprocessor 202 (of first vehicle 102*a*). Further, the tagged first sensor data and the second sensor data are analyzed to determine a relationship between the second sensor data extracted for an elapsed time interval, such as "last 10 seconds", prior to the detection of the horn sound, and the captured first sensor data. For example, the microprocessor 202 may analyze that when the first vehicle 102*a* changed lane without an indication, the steering angle of the first vehicle 102*a* was, "20 degrees", for "4 seconds", the speed was, "60 miles per hour", and then the horn sound that emanated from the second vehicle 102*b* was detected.

In accordance with an embodiment, the microprocessor 202 may be configured to perform machine learning based on the analysis of the tagged first sensor data and the second sensor data. The microprocessor 202 may store the learned data, such as the tagged second sensor data, in an associative relationship with the first sensor data. In instances when a similar traffic scenario, such as the first traffic scenario, is detected in the future by the first vehicle 102*a*, while in an autonomous mode, the first vehicle 102*a* may handle the detected traffic scenario, and a corresponding action can be automatically performed.

In accordance with an embodiment, the microprocessor 202 may be configured to recalibrate one or more control systems in the first vehicle 102*a*, to perform one or more functions associated with the first vehicle 102*a*. The microprocessor 202 may be configured to utilize the tagged first sensor data and the second sensor data for the recalibration of the one or more control systems, such as the horn control system 222 and the powertrain control system 214, of the first vehicle 102*a*.

In accordance with an embodiment, the one or more functions may correspond to a change of lane, a change of speed, provision of lane change indication, maintenance of a safe distance from one or more other vehicles, an application of horn of the horn control system 222, and/or an application of brakes of the braking system 218 of the first vehicle 102*a*. The one or more functions may further correspond to a change in driving path of the first vehicle 102*a* and generation of a safety alert via the display screen 210 and/or the audio interface 208. In accordance with an embodiment, the one or more functions may be performed to avoid violation of a traffic regulation. The one or more functions may be performed by the first vehicle 102*a* when the first vehicle 102*a* is in autonomous mode. In accordance with an embodiment, the microprocessor 202 may be configured to identify the first traffic scenario for automatic application of a horn at the first vehicle 102*a*, when first vehicle 102*a* operates in an autonomous mode. The identification of a subsequent traffic scenario similar to the first traffic scenario may be based on the capture of the first sensor data and the extraction of the second sensor data in the traffic scenario.

In accordance with an exemplary aspect of the disclosure, the capture of the first sensor data and the extraction of the second sensor data, as described above, may also occur when the horn is applied by the first vehicle 102*a*. In such instances, the microprocessor 202 may be configured to tag the captured first sensor data and the extracted second sensor data with metadata that corresponds to an application of the horn by the first vehicle 102*a*. Hence, the tagged first sensor data and the second sensor data may be further analyzed to determine the events and/or a particular traffic scenario in the vicinity of the first vehicle 102*a*, which caused the application of the horn at the first vehicle 102*a*.

In accordance with an embodiment, the microprocessor 202 may be configured to perform a machine learning, based on the analysis of the tagged first sensor data and the second sensor data related to application of the horn at the first vehicle 102*a*. As described previously, a similar traffic scenario, such as the first traffic scenario, may be detected in the future by the first vehicle 102*a* in an autonomous mode. The microprocessor 202 of the first vehicle 102*a* may easily handle the detected traffic scenario based on what has been learned from the tagged first sensor data and the second sensor data, related to one or both of the detection of horn sound and the application of horn sound by the first vehicle 102a.

In accordance with an embodiment, the microprocessor 202 may utilize the vehicle data communicated by other vehicles of the plurality of vehicles 102 to detect a pedestrian or an animal hidden from sight from the first vehicle 102a. In instances when the microprocessor 202 of the first vehicle 102a detects the hidden pedestrian or the animal that may move towards current driving path of the first vehicle 102a, the microprocessor 202 may analyze surrounding area in the vicinity of the first vehicle 102a.

Based on the analysis, the microprocessor 202 may transmit a control command to a suitable control system, such as the horn control system 222, for automatic application of the horn. The horn may be applied to alert the pedestrian or the animal. In accordance with an embodiment, a partial brake may be also be applied at the first vehicle 102a simultaneous to the application of the horn based on the analysis, to avoid a possible risk. Further, based on the analysis, full brakes may not be applied at the first vehicle 102a when one or more vehicles are detected in a close proximity behind the first vehicle 102a.

Figure 3A:
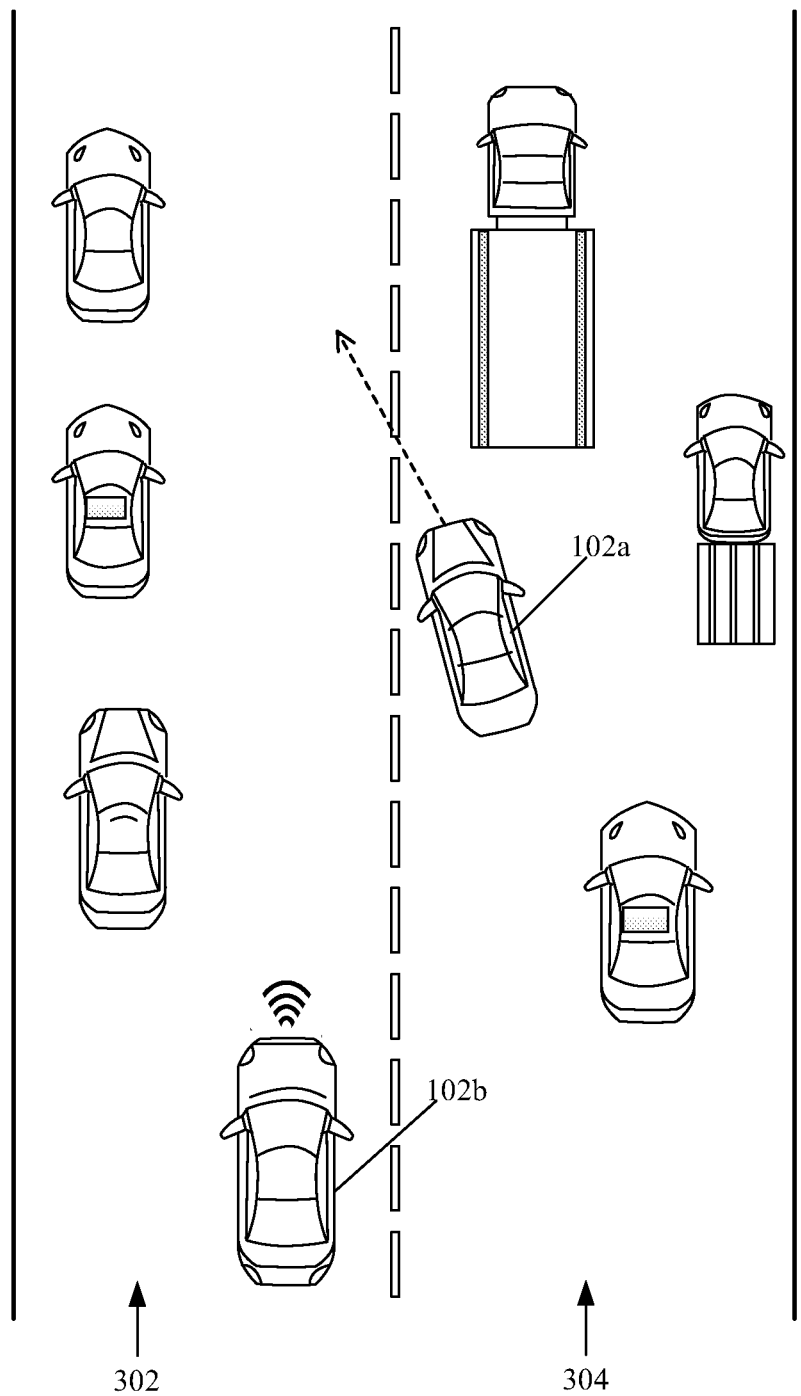
FIGS. 3A and 3B illustrate a first exemplary scenario for implementation of the disclosed system and method for an autonomous vehicle, based on horn detection, in accordance with an embodiment of the disclosure.
Figure 3B:
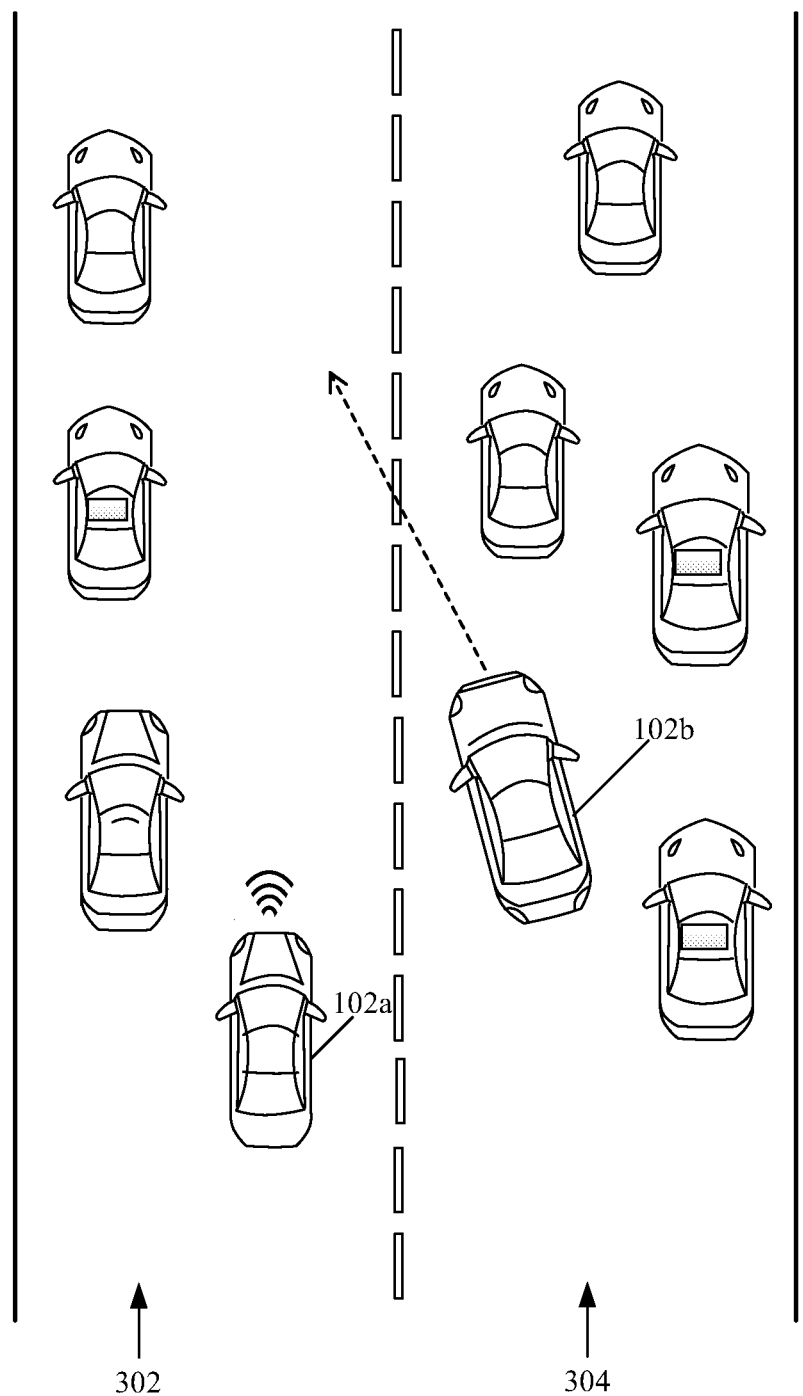

FIGS. 3A and 3B illustrate a first exemplary scenario for implementation of the disclosed adaptive system and method for an autonomous vehicle, based on detection of a horn, in accordance with an embodiment of the disclosure. FIG. 3A is explained in conjunction with elements from FIG. 1 and FIG. 2. FIG. 3A depicts an example of the first traffic scenario, such as a lane change scenario. With reference to FIG. 3A, there is shown a first lane 302, a second lane 304, the first vehicle 102a, and the second vehicle 102b. The various components of the first vehicle 102a, such as the ECU 108, the image-capturing units 110a to 110d, the sound sensors 112a to 112g, the object detection device 224, and other vehicle sensors of the sensing system 220, may be provided in the first vehicle 102a, but are not shown in the FIGS. 3A and 3B, for brevity.

In accordance with the first exemplary scenario, the first vehicle 102a and the second vehicle 102b may traverse in separate lanes along a road portion, such as the road portion 118. The second vehicle 102b may traverse in the first lane 302, and the first vehicle 102a may traverse in the second lane 304. The first vehicle 102a may attempt to change its course from the second lane 304 to the first lane 302. When the driver 116 of the second vehicle 102b observes that the first vehicle 102a attempts to change to the second lane 304 without provision of a lane change indication, the driver 116 of the second vehicle 102b may apply a horn as an alarm for the first vehicle 102a.

In operation, the ECU 108 of the first vehicle 102a may be configured to detect the horn sound emanated from the second vehicle 102b, by use of the sound sensors 112a to 112g. The ECU 108 may be configured to capture a video stream in the direction of detected horn sound by use of a rear camera, such as the image-capturing unit 110a or the image-capturing unit 110d (installed in the left ORVM as shown in FIG. 1). In accordance with an embodiment, the video stream may also be captured in 360 degrees, to capture the area that surrounds the vicinity of the first vehicle 102a. In accordance with an embodiment, the ECU 108 of the first vehicle 102a may be configured to determine whether the direction of the detected horn sound corresponds to the changed lane, such as from the first lane 302 to the second lane 304. The ECU 108 may be configured to activate a side RADAR (such as the object detection device 224) to capture additional sensor data to locate the sound emanating object, such as the second vehicle 102b. The ECU 108 may also receive vehicle data, such as lane information, speed, horn applied signal, and/or direction of travel information, from the second vehicle 102b.

In accordance with an embodiment, the ECU 108 may further calculate distance, speed, and/or angle between the first vehicle 102a and the other vehicles nearest to the first vehicle 102a. The calculation of the distance, speed, and/or angle may occur by use of sensor data received from the object detection device 224, such as the RADAR. For example, a linear distance ("9 feet") and a lateral distance ("5 feet") between the first vehicle 102a and the second vehicle 102b, may be calculated. The captured data (such as the captured video stream), the received vehicle data, and/or the sensor data, may collectively be referred to as the first sensor data. The first sensor data may indicate the first traffic scenario, such as the lane change scenario, in a vicinity of the first vehicle 102a. The first sensor data may be captured for a pre-determined area that surrounds the first vehicle 102a at a road portion, such as the road portion 118. The first sensor data may be captured for a pre-determined time interval subsequent to detection of the horn sound.

In accordance with an embodiment, the captured sensor data from the side RADAR may be compared with the captured sensor data from other sensors of the object detection device 224 and/or the image-capturing units 110a to 110d for an additional fail-safe check. When there is a contradiction among the captured sensor data from the plurality of sensors, this indicates a malfunction of at least one of sensors, and a result of the additional fail-safe check becomes failure. In an instance, when the result of the additional fail-safe check indicates failure, the ECU 108 may generate instruction for the driver to take control, if the first vehicle 102a is in autonomous mode. Additionally, information to indicate error of a sensor of the autonomous driving system or the ADAS may be sent to other nearby vehicles via the V2V communication or by use of the RSU 120 via the V2I communication. In another instance when the result of the additional fail-safe check indicates failure, the ECU 108 may log the horn detection event as false detection (a false positive), and may not tag the first sensor data with metadata, such as "Horn sound detected; Sudden lane change traffic scenario" for further analysis. In accordance an embodiment, the result of the additional fail-safe check indicates success. In such a case, the ECU 108 may extract the second sensor data and tag the captured first sensor data and the extracted second sensor data as "Horn sound detected; Sudden lane change traffic scenario", as described below.

In accordance with an embodiment, the microprocessor 202 may be configured to determine a position and/or a direction of the second vehicle 102b, with respect to the first vehicle 102a. For example, by use of the captured video data (that comprises the second vehicle 102b, the received vehicle data, or the object detection device 224), the position, the direction of the second vehicle 102b, and the traffic scenario from the perspective of the first vehicle 102a may be easily determined.

In accordance with an embodiment, the microprocessor 202 may extract second sensor data associated with the first vehicle 102a, from the in-vehicle network 226. The second sensor data may be extracted for an elapsed time interval, such as "last 10 seconds", prior to the detection of the horn sound. The extracted second sensor data, such as steering angle, speed value, and/or the rate-of-change of speed, lane information, position information (latitude and longitude information) of the first vehicle 102a, together with the captured first sensor data, may provide sufficient information to understand a reason for application of the horn by the second vehicle 102b.

In accordance with an embodiment, the microprocessor 202 may be configured to tag the captured first sensor data and the extracted second sensor data with metadata of "horn sound detected". The tagged first sensor data and the second sensor data may be used to understand why the second vehicle 102b applied horn for the first vehicle 102a during the first traffic scenario from the perspective of the first vehicle 102a. In an another instance, the tagged first sensor data and the second sensor data may be sent to the cloud server 104 via the RSU 120 so that the first traffic scenario is analyzed at the cloud server 104.

In accordance with an embodiment, the ECU 108 may learn information from the scenario. Such learned information may include facts, such as the steering angle of the first vehicle 102a was changed, the first vehicle 102a changed its current lane from the second lane 304 to the first lane 302, the speed value was "60 miles per hour", and a lane change indication signal was absent in the extracted second sensor data, prior to the detection of the horn sound. The learned information may further include relative distance between the first vehicle 102a and the second vehicle 102b at a time of detection of a horn sound from the second vehicle 102b. The ECU 108 may store the learned information, such as above mentioned parameters of the tagged second sensor data in an associative relationship with the first sensor data, such that parameters in the ADAS or autonomous driving of the first vehicle 102a may be adjusted by analyzing the stored learned information. When a similar traffic scenario is encountered in the future, an appropriate action may be performed, as shown and described below in FIG. 3B. For example, when the first vehicle 102a starts to change a lane, a threshold distance, as a safe distance to other vehicle driving on an adjacent lane, may be changed based on the learned information to have much more margin distance to other vehicles. Alternatively, when the first vehicle 102a cannot analyze the captured first sensor data and the extracted second sensor data by itself, the first vehicle 102a may send such captured data to the cloud server 104. The first vehicle 102a then may receive a command from the cloud server 104 to adjust one or more parameters for the autonomous or the ADAS system. The command may be generated at the cloud server 104 based on the analysis of the captured first sensor data and the extracted second sensor data received from the first vehicle 102a or the RSU 120 that may be communicatively coupled to the first vehicle 102a.

With reference to FIG. 3B, there is shown the first lane 302, the second lane 304, the first vehicle 102a and the second vehicle 102b. In this case, the first vehicle 102a may traverse in the first lane 302 in autonomous mode. The second vehicle 102b may traverse in the second lane 304 in manual mode (driven by the driver 116). The driver 116 of the second vehicle 102b may change its current lane, such as the second lane 304 abruptly or without provision of a lane change indication.

In operation, the first vehicle 102a in the autonomous mode may be configured to continuously monitor objects in its vicinity by use of one or more sensors of the sensing system 220, such as one or more of the image-capturing units 110a to 110d and the object detection device 224. The first vehicle 102a may be configured to compare the current traffic scenario with tagged data, such as the tagged first sensor data and the second sensor data.

In accordance with an embodiment, the ECU 108 may be configured to recalibrate one or more control systems, such as the powertrain control system 214, the braking system 218, the horn control system 222, in the first vehicle 102a, to perform one or more functions associated with the first vehicle 102a. The recalibration of the one or more control systems may be based on the tagged first sensor data and the extracted second sensor data, and/or the learned information from previous instances, such as described in the FIG. 3A. For example, the ECU 108 may be configured to determine whether a linear or a lateral distance between the nearest vehicles of the plurality of vehicles 102, such as the second vehicle 102b, is unsafe or safe. The ECU 108 may be configured to check whether lane change indication is active or inactive at the second vehicle 102b by use of the captured video stream of the second vehicle 102b.

In instances when a safe distance is determined, the ECU 108 may be configured to traverse and reduce speed automatically to accommodate the second vehicle 102b, in the first lane 302. In instances when an unsafe distance is determined, the lane change indication is inactive, or an abrupt change of lane is determined, the ECU 108 may be configured to identify the first traffic scenario, such as the lane change scenario by the second vehicle 102b, for an automatic application of a horn, via the horn control system 222 at the first vehicle 102a. The identification may be based on the comparison of the current traffic scenario with tagged data, and/or the learned information from previous instances, as described above.

In accordance with an embodiment, the ECU 108 in the autonomous mode may be configured to detect a change in momentum, a change in driving path, and/or other reaction signals of the second vehicle 102b that may indicate a response to the applied horn. The ECU 108 in the autonomous mode may be configured to further transmit one or more commands to other ECUs, such as the powertrain control system 214, to reduce the current speed of the first vehicle 102a, by auto-application of brakes from the braking system 218, to accommodate the second vehicle 102b. Thus, the accuracy of the drive of the first vehicle 102a in the autonomous mode is enhanced from other users' point-of-view.

Figure 4A:
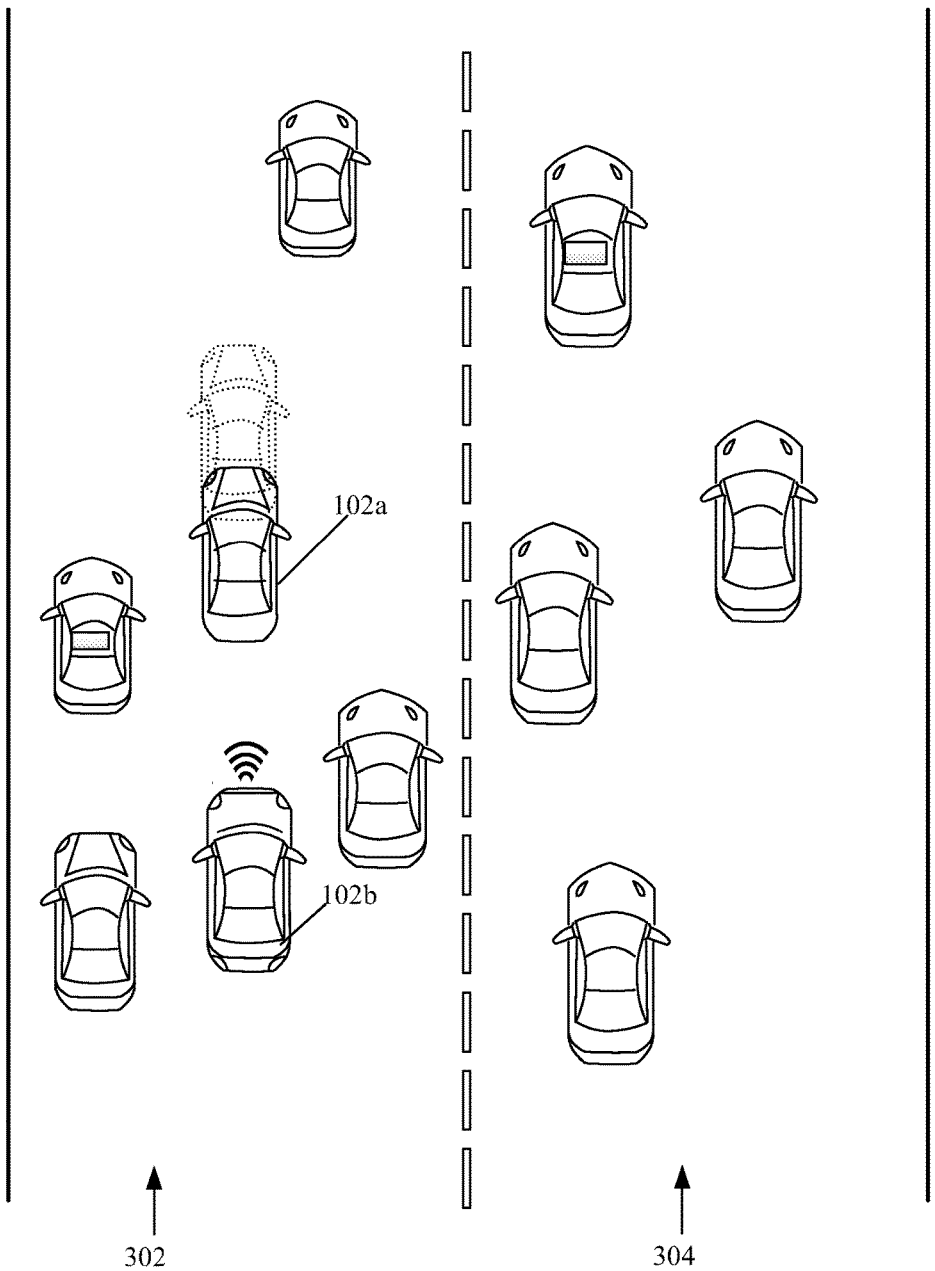
FIGS. 4A and 4B illustrate a second exemplary scenario for implementation of the disclosed system and method for an autonomous vehicle, based on horn detection, in accordance with an embodiment of the disclosure.
Figure 4B:
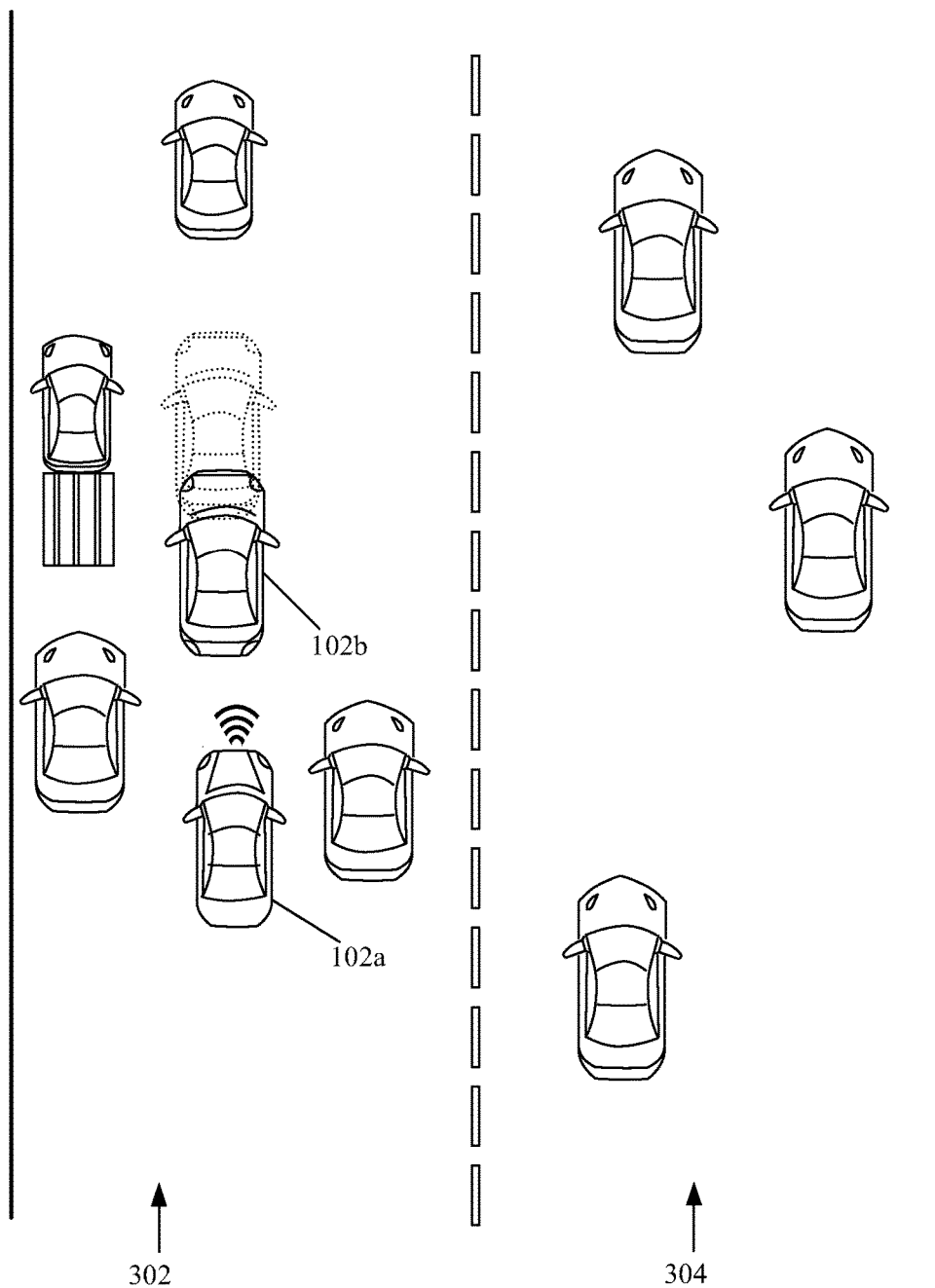

FIGS. 4A and 4B illustrate a second exemplary scenario for implementation of the disclosed adaptive system and method for an autonomous vehicle based on detection of a horn, in accordance with an embodiment of the disclosure. FIG. 4A is explained in conjunction with elements from FIGS. 1, 2, 3A, and 3B. FIG. 4A depicts a second example of the first traffic scenario, such as a sudden deceleration scenario, With reference to FIG. 4A, there is shown the first lane 302, the second lane 304, the first vehicle 102a and the second vehicle 102b, similar to that of FIG. 3A.

In accordance with the second exemplary scenario, the first vehicle 102a and the second vehicle 102b may traverse along a same lane, such as the first lane 302, along the road portion 118. The driver 114 of the first vehicle 102a may suddenly apply the brakes to avoid an obstacle ahead of the first vehicle 102a. When the driver 116 of the second vehicle 102b observes a sudden deceleration of the first vehicle 102a, which traverses ahead of the second vehicle 102b (as shown), the driver 116 of the second vehicle 102b may apply a horn as an alarm for the first vehicle 102a.

In operation, the ECU 108 of the first vehicle 102a may be configured to detect the horn sound emanated from the second vehicle 102b, by use of the sound sensors 112a to 112g. The ECU 108 may be configured to capture first sensor data in the vicinity of the first vehicle 102a, as described previously in FIGS. 2 and 3A. The microprocessor 202 may extract second sensor data for an elapsed time interval, such as the "last 15 seconds" prior to the detection of the horn sound. The second sensor data extracted from the in-vehicle network 226 of the first vehicle 102a may be a rate-of-change of speed, a steering angle, a speed value, lane information, position information (latitude and longitude information) of the first vehicle 102a.

In accordance with an embodiment, the microprocessor 202 may be configured to tag the captured first sensor data and the extracted second sensor data with metadata, such as, "Horn sound detected; sudden deceleration traffic scenario". The tagged first sensor data and the second sensor data may be used to understand (from the perspective of the first vehicle 102a) why the second vehicle 102b applied the horn at the first vehicle 102a for the first traffic scenario.

In accordance with an embodiment, the ECU 108 may infer, based on machine learning, that the sudden deceleration of the first vehicle 102a from the current speed value of "60 miles per hour" to "40 miles per hour", may cause an obstruction and inconvenience on the driving path of the second vehicle 102b. In instances when a similar traffic scenario is detected in the future by the ECU 108, an analogous action may be performed, as shown and described below in FIG. 4B.

With reference to FIG. 4B, there is shown the first lane 302, the second lane 304, the first vehicle 102a and the second vehicle 102b. In this example, the first vehicle 102a may traverse in the first lane 302, in autonomous mode. The second vehicle 102b may traverse in the first lane 302 in front of the first vehicle in manual mode (driven by the driver 116). The driver 116 of the second vehicle 102b may suddenly decelerate that may cause an obstruction in the driving path of the first vehicle 102a.

In operation, the ECU 108 may be configured to recalibrate one or more control systems, such as the powertrain control system 214 and/or the horn control system 222, in the first vehicle 102a, to automatically apply the brake to decelerate the first vehicle 102a. The ECU 108 may be configured to identify the first traffic scenario, such as the sudden deceleration scenario by the second vehicle 102b, for an automatic application of the horn via the horn control system 222 at the first vehicle 102a. The identification may be based on the comparison of the current traffic scenario with tagged data, and/or the learned information from previous instances, as described in FIG. 4A. In instances when the ECU 108 does not detect a response for the applied horn, the ECU 108 may automatically transmit a control signal to the powertrain control system 214 and/or the steering system 216 to change the driving path of the first vehicle 102a in the autonomous mode. Thus, the accuracy of the drive of the first vehicle 102a in the autonomous mode is enhanced for various traffic scenarios from other users' point-of-view.

Figure 5A:
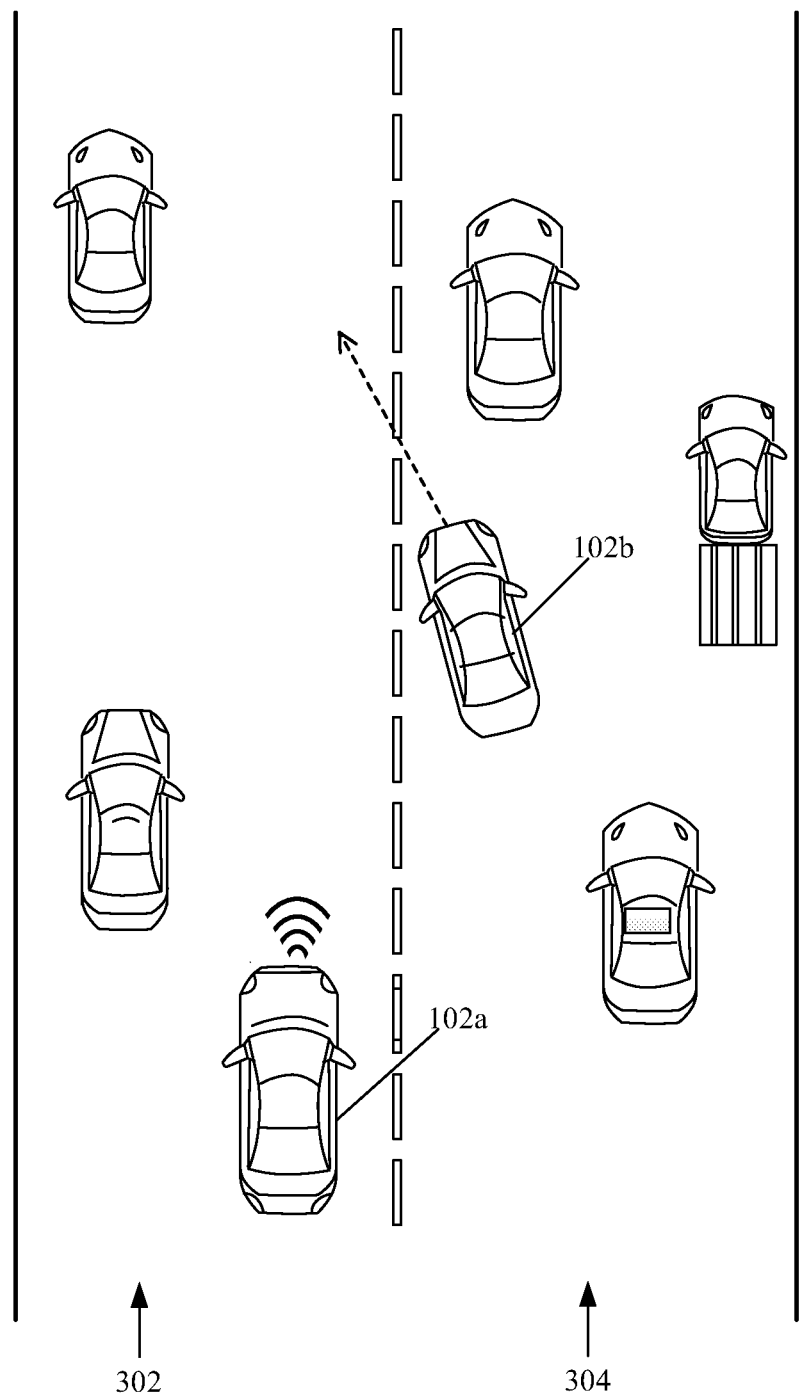
FIGS. 5A and 5B illustrate a third exemplary scenario for implementation of the disclosed system and method for an autonomous vehicle, based on application of a horn, in accordance with an embodiment of the disclosure.
Figure 5B:
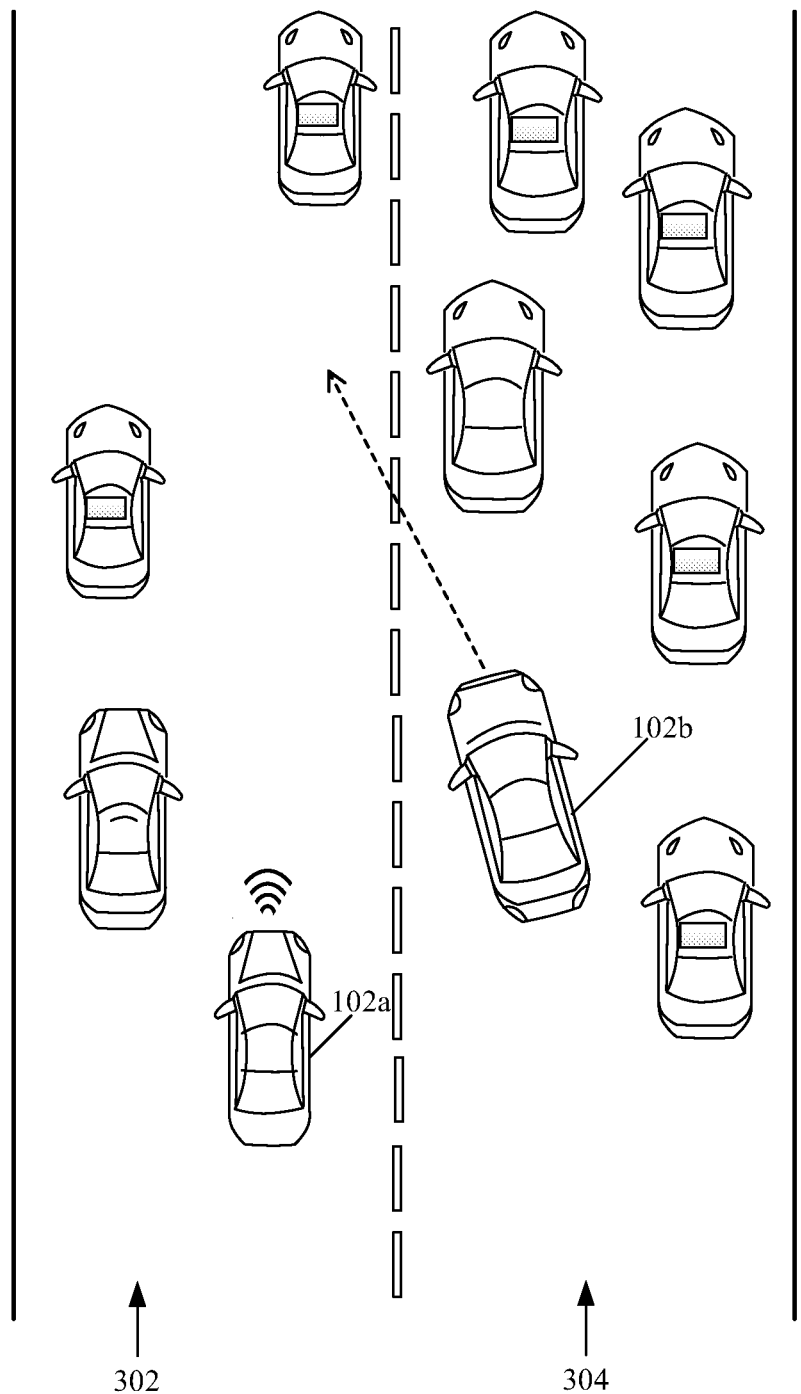

FIGS. 5A and 5B illustrate a third exemplary scenario for implementation of the disclosed system and method for an autonomous vehicle based on application of a horn, in accordance with an embodiment of the disclosure. FIG. 5A is explained in conjunction with elements from FIGS. 1, 2, 3A, 3B, 4A, and 4B. FIG. 5A depicts an example of the first traffic scenario, such as an abrupt lane change scenario without indication. With reference to FIG. 5A, there is shown the first lane 302, the second lane 304, the first vehicle 102a, and the second vehicle 102b. There is further shown one or more other vehicles that may traverse in the first lane 302 and/or the second lane 304.

In accordance with the third exemplary scenario, the first vehicle 102a may be an autonomous vehicle that may traverse in a fixed lane, such as the first lane 302. Another non-autonomous vehicle, such as the second vehicle 102b, may traverse in an adjacent lane, such as the second lane 304. The second vehicle 102b moving in the second lane 304 may attempt to suddenly change its course from the second lane 304 to the first lane 302. The driver 114 of the first vehicle 102a may observe that the second vehicle 102b attempts to move towards the first lane 302 without provision of a lane change indication. The driver 114 of the first vehicle 102a may further observe that the second vehicle 102b may not be at a safe distance from the first vehicle 102a. The driver 114 of the first vehicle 102a may then apply a horn at the first vehicle 102a as an alarm for the second vehicle 102b. In accordance with an embodiment, the driver 114 may reduce speed to accommodate the second vehicle 102b in such instances of the first traffic scenario.

In accordance with an embodiment, the sound sensors 112a to 112g may be configured to capture the horn sound emanated from self-application of horn at the first vehicle 102a. The ECU 108 of the first vehicle 102a may be configured to ascertain whether the captured horn sound is a horn sound emanated from the first vehicle 102a or other vehicles on the road portion 118. The ECU 108 of the first vehicle 102a may check presence of a horn signal for self-application of the horn, in the in-vehicle network 226, such as the CAN bus, of the first vehicle 102a. In this case, the horn signal may be detected in the in-vehicle network 226, as the horn was applied at the first vehicle 102a.

In accordance with an embodiment, the ECU 108 may be configured to capture a video stream of an area that surrounds the first vehicle 102a, by use of one or more of the image-capturing units 110a to 110d. The ECU 108 may be further configured to capture sensor data from the object detection device 224 of the first vehicle 102a. The captured video stream and the sensor data may be collectively referred to as the captured first sensor data. The first sensor data may indicate the first traffic scenario, such as the abrupt lane change scenario without the lane change indication by the second vehicle 102b, in the vicinity of the first vehicle 102a. The first sensor data may be captured for a predetermined time interval, such as "60 seconds", subsequent to application of the horn at the first vehicle 102a.

In accordance with an embodiment, the ECU 108 may extract the second sensor data associated with the first vehicle 102a, from the in-vehicle network 226. The second sensor data may be extracted for an elapsed time interval, such as "last 10 seconds", prior to the application of horn. The ECU 108 may be configured to tag the captured first sensor data and the extracted second sensor data with metadata of "application of horn". The events and/or conditions in the above described first traffic scenario that triggered the application of the horn at the first vehicle 102a may be logged and analyzed at the ECU 108 based on the captured first sensor data and the extracted second sensor data. For example, the events and/or conditions may be a linear or a lateral distance between the first vehicle 102a and other nearest vehicles, active or inactive state of the lane change indication at the second vehicle 102b, and/or the sudden change of lane by the second vehicle 102b.

In accordance with an embodiment, when the horn is applied, based on the tagged first sensor data and the second sensor data, a response from the second vehicle 102b may be determined. For example, a change in momentum of the second vehicle 102b, a change in driving path, and/or other signals of the second vehicle 102b that may indicate a response to the applied horn, may also be logged for analysis. The tagged first sensor data and the second sensor data may be analyzed to understand why the driver 114 applied horn for the second vehicle 102b. The tagged first sensor data and the second sensor data may be analyzed to determine what action was taken at the first vehicle 102a in the first traffic scenario. Examples of the one or more actions taken by the first vehicle 102a may include, reduction of speed at the first vehicle 102a to accommodate the second vehicle 102b, and an application of horn to alarm the second vehicle 102b in such first traffic scenario. The one or more actions taken by the first vehicle 102a may be logged. The ECU 108 may be configured to identify a category of the first traffic scenario as "abrupt lane change scenario without indication". The identified category of the first traffic scenario may also be tagged together with the tagging of the captured first sensor data and the extracted second sensor data with metadata of "application of horn", such as "application of horn; abrupt lane change scenario without indication".

In accordance with an embodiment, the microprocessor 202 may be configured to perform machine learning, based on the analysis of the tagged first sensor data and the second sensor data related to application of the horn at the first vehicle 102a. The ECU 108 may be configured to recalibrate one or more control systems, such as the powertrain control system 214, the braking system 218, the horn control system 222, in the first vehicle 102a. The recalibration of the one or more control systems may be based on the tagged first sensor data and the second sensor data, and/or the learned information from the analysis. The recalibration may provide an ability to the ECU 108 of the first vehicle 102a to adapt to similar traffic scenarios, such as the first traffic scenario of the abrupt lane change scenario without indication, that may be detected in the future by the first vehicle 102a in an autonomous mode, as shown and described below in FIG. 5B.

With reference to FIG. 5B, there is shown the first lane 302, the second lane 304, the first vehicle 102a, the second vehicle 102b, and other vehicles of the plurality of vehicles 102. In this case, the first vehicle 102a may be operated in autonomous mode (not driven by the driver 114). The first vehicle 102a may traverse in the first lane 302 in the autonomous mode. The second vehicle 102b may traverse in the second lane 304 in manual mode (driven by the driver 116).

In operation, the first vehicle 102a in the autonomous mode may be configured to continuously or periodically monitor objects in its vicinity by use of one or more sensors of the sensing system 220, such as one or more of the image-capturing units 110a to 110d and the object detection device 224. The driver 116 of the second vehicle 102b may change its current lane, such as the second lane 304 abruptly or without provision of a lane change indication. In such an instance, the ECU 108 of the first vehicle 102a may be configured to compare the current traffic scenario with tagged data, such as the tagged first sensor data and the second sensor data.

In accordance with an embodiment, the ECU 108 may be configured to identify the current traffic scenario as the first traffic scenario of the abrupt lane change scenario without indication. The identification may be based on the comparison of the current traffic scenario with tagged data, and/or the learned information from previous instances, as described above. The ECU 108 may be configured to send a command to the horn control system 222 at the first vehicle 102a for an automatic application of the horn. The ECU 108 in the autonomous mode may be configured to further transmit one or more commands to other ECUs, such as the powertrain control system 214, to reduce the current speed of the first vehicle 102a, by auto-application of brakes from the braking system 218, to accommodate the second vehicle 102b. Thus, the ECU 108 of the first vehicle 102a may be adapted to improve the accuracy of the drive of the first vehicle 102a in the autonomous mode that may mimic an error-free human-like drive in the autonomous mode.

Figure 6A:
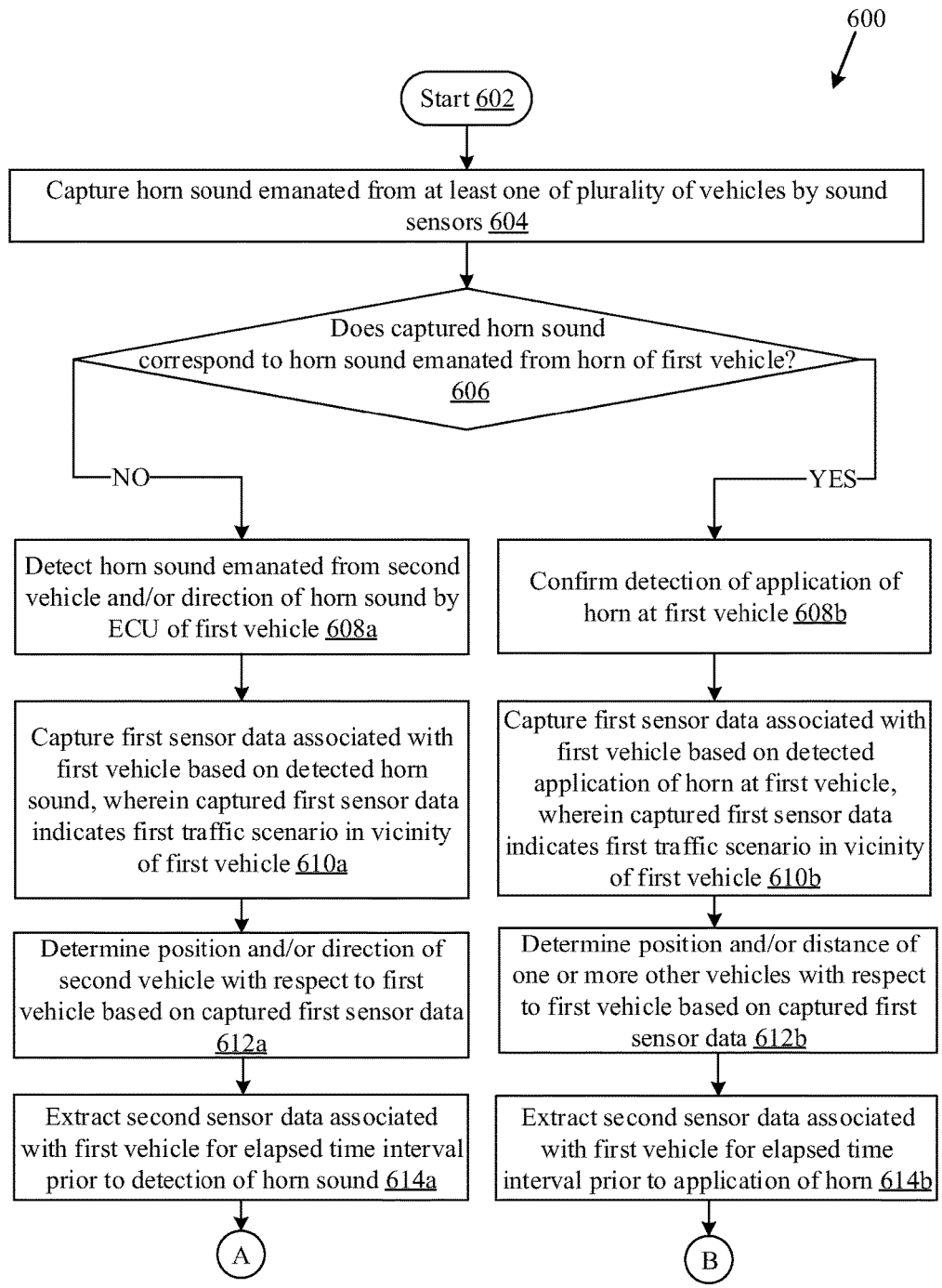
FIGS. 6A and 6B collectively depict a flow chart that illustrates an exemplary method for an autonomous vehicle, based on detection and/or application of a horn, in accordance with an embodiment of the disclosure.
Figure 6B:
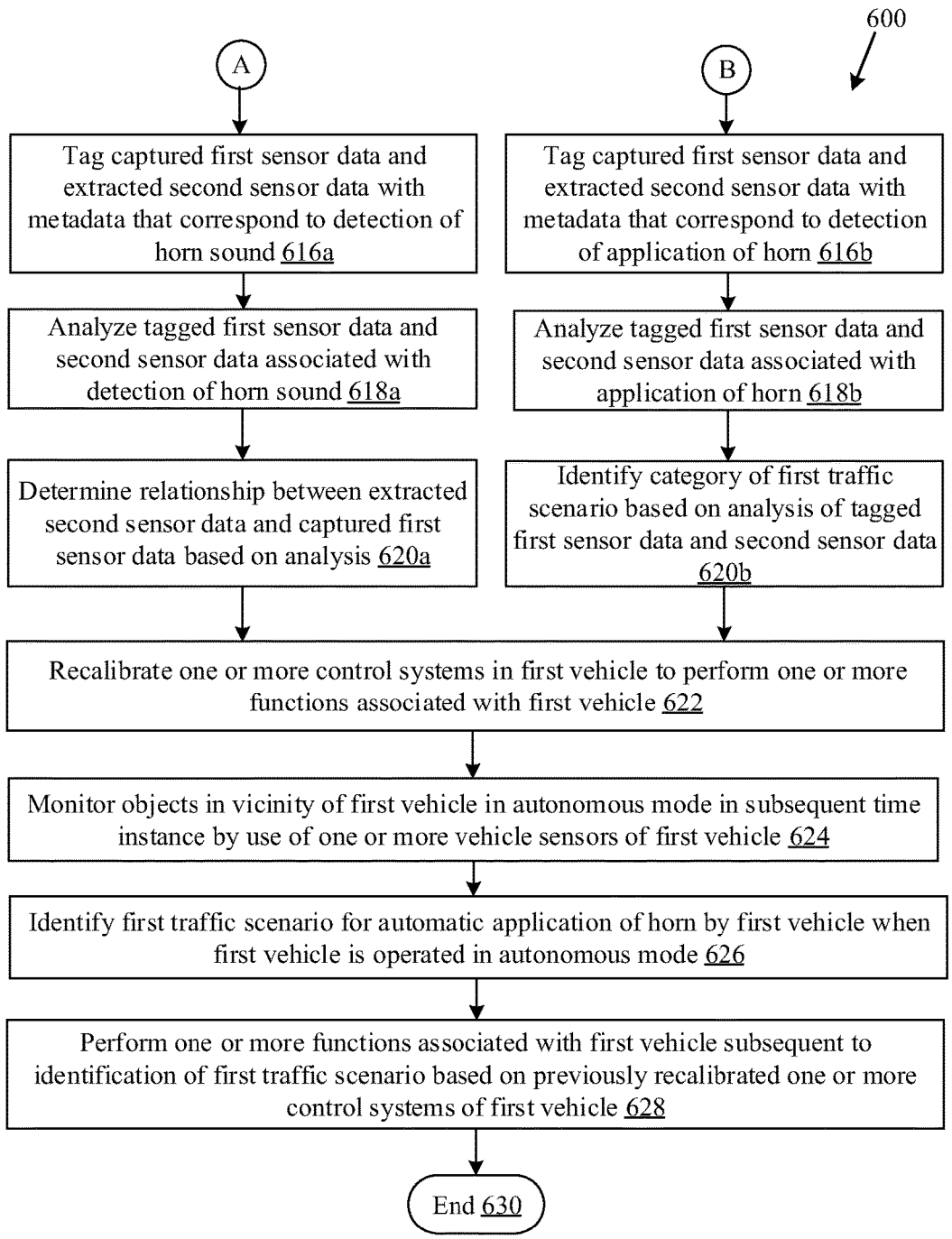

FIGS. 6A and 6B is a flow chart that illustrates an exemplary method for an autonomous vehicle, based on detection of a horn, in accordance with an embodiment of the disclosure. With reference to FIGS. 6A and 6B, there is shown a flow chart 600. The flow chart 600 is described in conjunction with FIGS. 1, 2, 3A, 3B, 4A, 4B, 5A, and 5B. The method starts at step 602 and proceeds to step 604.

At step 604, a horn sound emanated from at least one of the plurality of vehicles 102 may be captured by sound sensors, such as the sound sensors 112a to 112g of the first vehicle 102a. At step 606, it may be checked whether the captured horn sound is horn sound emanated from a horn of the first vehicle 102a or from another vehicle of the plurality of vehicles 102. A presence of a horn signal in the in-vehicle network 226, such as the CAN bus, may be checked to confirm application of the horn at the first vehicle 102a. In instances when the horn signal is not present in the in-vehicle network 226 of the first vehicle 102a, the control passes to step 608a. In instances when the horn signal is present in the in-vehicle network 226 of the first vehicle 102a, the control passes to step 608b.

At step 608a, a direction of horn sound may be detected by the ECU 108 of the first vehicle 102a. It may be detected that the horn sound captured by sound sensors 112a to 112g may be emanated from the second vehicle 102b (as shown in FIGS. 3A and 4A). At step 610a, the first sensor data associated with the first vehicle 102a may be captured based on the detected horn sound. The captured first sensor data may correspond to a video stream of the current traffic scenario, such as the first traffic scenario, in the vicinity of the first vehicle 102a, as described in FIGS. 2, 3A and 4A. The captured first sensor data may further correspond to vehicle data received from one or more connected vehicles of the plurality of vehicles 102 in the vicinity of the first vehicle 102a. The captured first sensor data may also correspond to sensor data received from the object detection device 224, such as RADAR, of the sensing system 220. The captured first sensor data indicates the first traffic scenario in the vicinity of the first vehicle 102a. Examples of the first traffic scenario is described previously in FIGS. 2, 3A, 3B, 4A and 4B.

At step 612a, a position and/or a direction of the second vehicle 102b, with respect to the first vehicle 102a, may be determined based on the captured first sensor data. At step 614a, the second sensor data associated with the first vehicle 102a may be extracted from the in-vehicle network 226 of the first vehicle 102a. The second sensor data may be extracted from the in-vehicle network 226 for an elapsed time interval prior to the detection of the horn sound. The second sensor data may be a steering angle, a yaw rate, a speed value, and/or a rate-of-change of speed, a vehicle positional accuracy data, and/or a brake system status of the first vehicle 102a. The second sensor data may also correspond to a status of a vehicle stability system, lane information, and/or other vehicle parameters of the first vehicle 102a that may be extracted from the in-vehicle network 226.

At step 616a, the captured first sensor data and the extracted second sensor data may be tagged with metadata. The metadata may correspond to the detection of the horn sound. At step 618a, the tagged first sensor data and the second sensor data that corresponds to the detection of the horn sound, may be analyzed. The analysis may be performed to determine the events that caused a particular traffic scenario in the vicinity of the first vehicle 102a, around the time of detection of the horn sound. At step 620a, a relationship between the extracted second sensor data prior to the detection of the horn sound, and the captured first sensor data, may be determined based on the analysis. The relationship between the second sensor data and the first sensor data may be determined so that when a similar traffic scenario, such as the first traffic scenario, is detected in the future by the first vehicle 102a, while in an autonomous mode, the first vehicle 102a may handle the detected traffic scenario, and a corresponding action can be automatically performed.

At step 622, one or more control systems in the first vehicle 102a may be recalibrated to perform one or more functions associated with the first vehicle 102a. The one or more functions are described in detail in FIGS. 1, 2, 3B, 4B, and 5B. The recalibration of the one or more control systems, such as the powertrain control system 214 and the horn control system 222, in the first vehicle 102a may be based on the captured first sensor data and the extracted second sensor data. For example, threshold of one or more parameters of the autonomous driving system or the ADAS system may be adjusted or newly set based on the analysis of the steps 618a, 618b, 620a and/or 620b. The adjusted parameters may be a relative distance to other vehicle for lane change or braking, one or more time parameters that represents when and in which direction to take a turn based on a direction signal or driving speed. In instances when the first vehicle 102a determines that the recalibration may not be possible, the tagged first sensor data and the second sensor data may be sent to the cloud server 104 for a further analysis of the system of the first vehicle 102a and the first scenario. At step 624, one or more objects, such as other vehicles and/or pedestrians, in the vicinity of the first vehicle 102a may be monitored by use of the sensing system 220 of the first vehicle 102a. The one or more objects may be monitored in a time instance subsequent to the recalibration.

At step 626, the first traffic scenario, such as a current traffic scenario in the subsequent time instance, may be identified for an automatic application of the horn by the first vehicle 102a when the first vehicle 102a is operated in an autonomous mode. At step 628, the one or more functions associated with the first vehicle 102a may be performed subsequent to the identification of the first traffic scenario. The one or more functions may be performed based on the recalibrated one or more control systems of first vehicle 102a. For example, speed may be reduced automatically at the first vehicle 102a in addition to application of the horn to accommodate the second vehicle 102b, as shown and described in FIGS. 3B and 5B. In another example, brakes may be automatically applied to decelerate the first vehicle 102a and/or the driving path of the first vehicle 102a may be changed, as described in FIGS. 4B and 5B. The control may pass to end step 630.

In instances when the horn signal is present in the in-vehicle network 226 of the first vehicle 102a, the control passes to step 608b. At step 608b, detection of an application of the horn at the first vehicle 102a may be confirmed. At step 610b, the first sensor data associated with the first vehicle 102a may be captured based on the detected application of horn at the first vehicle 102a. The captured first sensor data indicates a current traffic scenario, such as the first traffic scenario, in the vicinity of the first vehicle 102a.

At step 612b, position and/or distance of other vehicles of the plurality of vehicles 102 with respect to the first vehicle 102a, may be determined based on the captured first sensor data. At step 614b, the second sensor data associated with the first vehicle 102a may be extracted from the in-vehicle network 226 of the first vehicle 102a. The second sensor data may be extracted from the in-vehicle network 226 for an elapsed time interval prior to the application of the horn.

At step 616b, the captured first sensor data and the extracted second sensor data may be tagged with metadata that corresponds to the detection of application of horn at the first vehicle 102a. At step 618b, the tagged first sensor data and the second sensor data that corresponds to the application of the horn, may be analyzed. At step 620b, a category of the first traffic scenario may be identified based on the analysis of the tagged first sensor data and the second sensor data associated with application of horn. The category may correspond to one of the different types of the first traffic scenario, such as an abrupt lane change, a lane change without indication, a sudden deceleration, a sudden or slow acceleration, incorrect lane driving, violation of lane markings, non-maintenance of proper distance between vehicles, incorrect driving speed, and/or other traffic scenarios that may be related to violation of traffic rules. The control may then pass to the step 622.

In accordance with an embodiment, at the step 604, the capturing of horn sound is an exemplary step. Alternatively, and in instances when information (such as horn signals) to warn or notify other vehicles as a horn function is sent as data among vehicles via wireless communication, such as the V2V or V2I, instead of the horn sound, the ECU 108 may detect the information by receiving it via wireless communication or a horn signal of the other vehicle as indicated in the in-vehicle network 226.

In accordance with an embodiment, at the step 606, instead of detecting a horn signal in the in-vehicle network 226, the ECU 108 may detect a signal from a panic button or an emergency button which a passenger of the first vehicle 102a pushes, for detecting a dangerous situation triggered by a passenger of the first vehicle 102a. Further, in accordance with an embodiment, at the steps 618a and 618b, analysis of the tagged first sensor data and second sensor data may be performed at the cloud server 104 when such data is sent to the cloud server 104 from the first vehicle 102a. In this case, the cloud server 104 may send a command to the first vehicle 102a to recalibrate one or more control system in the first vehicle 102a. Such a command may be sent before the step 622 to initiate the recalibration of the one or more control system in the first vehicle 102a.

In accordance with an embodiment of the disclosure, a system for an autonomous vehicle based on detection and/or application of horn is disclosed. The system (such as the ECU 108 (FIG. 1)) may comprise one or more circuits (hereinafter referred to as the microprocessor 202 (FIG. 2)). The microprocessor 202 may be configured to detect a horn sound emanated from the second vehicle 102b (FIG. 1). The microprocessor 202 may be configured to capture the first sensor data associated with the first vehicle 102a (FIG. 1) based on the detected horn sound. The captured first sensor data indicates a first traffic scenario in a vicinity of the first vehicle 102a. The microprocessor 202 may be configured to extract second sensor data associated with the first vehicle 102a for an elapsed time interval prior to the detection of the horn sound. The microprocessor 202 may be further configured to recalibrate one or more control systems in the first vehicle 102a, to perform one or more functions associated with the first vehicle 102*a*. The recalibration may be based on the captured first sensor data and the extracted second sensor data.

In accordance with an exemplary aspect of the disclosure, another system for an autonomous vehicle based on detection and/or application of horn is disclosed. The system (such as the ECU 108 (FIG. 1)) may comprise one or more circuits (hereinafter referred to as the microprocessor 202 (FIG. 2)). The microprocessor 202 may be configured to detect an application of a horn at the first vehicle 102*a* (FIG. 1). The microprocessor 202 may be configured to capture the first sensor data associated with the first vehicle 102*a* (FIG. 1) based on the detected application of the horn at the first vehicle. The captured first sensor data indicates a first traffic scenario in a vicinity of the first vehicle 102*a*. The microprocessor 202 may be configured to extract second sensor data associated with the first vehicle 102*a* for an elapsed time interval prior to the application of the horn. The microprocessor 202 may be further configured to recalibrate one or more control systems in the first vehicle 102*a*, to perform one or more functions associated with the first vehicle 102*a*. The recalibration may be based on the captured first sensor data and the extracted second sensor data.

In accordance with an embodiment of the disclosure, a vehicle (such as the first vehicle 102*a* (FIGS. 1 and 2)) is disclosed. The vehicle may comprise the vehicle body 228 (FIG. 2). The vehicle may further comprise one or more sensors, such as the sensors of the sensing system 220 (FIG. 2). The one or more sensors may be configured to detect a horn sound emanated from another vehicle, such as the second vehicle 102*b* (FIG. 1). The one or more sensors may be configured to capture first sensor data and second sensor data associated with the vehicle. The vehicle may further comprise one or more circuits (hereinafter referred to as the microprocessor 202 (FIG. 2)) that may be used in an electronic control unit (such as the ECU 108 (FIGS. 1 and 2)) of the vehicle, such as the first vehicle 102*a*. The microprocessor 202 may be configured to receive the captured first sensor data associated with the vehicle (such as the first vehicle 102*a*), based on the detected horn sound. The captured first sensor data may indicate a first traffic situation, such as the first traffic scenario, in a vicinity of the vehicle, such as the first vehicle 102*a*. The microprocessor 202 may be configured to receive the captured second sensor data associated with the vehicle (such as the first vehicle 102*a*), for an elapsed time interval prior to the detection of the horn sound. The microprocessor 202 may be further configured to recalibrate one or more control systems in the vehicle (such as the first vehicle 102*a*), to perform one or more functions associated with the vehicle. The recalibration may be based on the received first sensor data and the second sensor data.

In accordance with an exemplary aspect of the disclosure, a vehicle (such as the first vehicle 102*a* (FIGS. 1 and 2)) is disclosed. The vehicle may comprise the vehicle body 228 (FIG. 2). The vehicle may further comprise one or more sensors, such as the sensors of the sensing system 220 (FIG. 2). The one or more sensors may be configured to capture first sensor data and second sensor data associated with the vehicle. The vehicle may further comprise one or more circuits (hereinafter referred to as the microprocessor 202 (FIG. 2)) that may be used in an electronic control unit (such as the ECU 108 (FIGS. 1 and 2)) of the vehicle, such as the first vehicle 102*a*. The microprocessor 202 may be configured to detect an application of a horn at the vehicle. The microprocessor 202 may be configured to receive the captured first sensor data associated with the vehicle (such as the first vehicle 102*a*), based on the detection of application of the horn at the first vehicle. The captured first sensor data may indicate a first traffic situation, such as the first traffic scenario, in a vicinity of the vehicle, such as the first vehicle 102*a*. The microprocessor 202 may be configured to receive the captured second sensor data associated with the vehicle (such as the first vehicle 102*a*), for an elapsed time interval prior to the application of the horn. The microprocessor 202 may be further configured to recalibrate one or more control systems in the vehicle (such as the first vehicle 102*a*), to perform one or more functions associated with the vehicle. The recalibration may be based on the received first sensor data and the second sensor data.

Various embodiments of the disclosure may provide a non-transitory computer readable medium and/or storage medium, having stored thereon, a set of computer-executable instructions to cause a machine and/or a computer for adaptive control of an autonomous vehicle based on detection of horn sound. The set of computer-executable instructions in an ECU, such as the ECU 108 (FIG. 1), may cause the machine and/or computer to perform the steps that comprise detection of a horn sound emanated from the second vehicle 102*b*. First sensor data associated with the first vehicle 102*a* (FIG. 1) may be captured based on the detected horn sound. The captured first sensor data indicates a first traffic scenario in a vicinity of the first vehicle 102*a*. Second sensor data associated with the first vehicle 102*a* may be extracted for an elapsed time interval prior to the detection of the horn sound. One or more control systems in the first vehicle 102*a* may be recalibrated to perform one or more functions associated with the first vehicle 102*a*. The recalibration may be based on the captured first sensor data and the extracted second sensor data.

In accordance with an exemplary aspect, various embodiments of the disclosure may provide another non-transitory computer readable medium and/or storage medium, having stored thereon, a set of computer-executable instructions to cause a machine and/or a computer for adaptive control of an autonomous vehicle based on application of a horn. The set of computer-executable instructions in an ECU, such as the ECU 108 (FIG. 1), may cause the machine and/or computer to perform the steps that comprise detection of an application of a horn at a first vehicle 102*a* (FIG. 1). First sensor data associated with the first vehicle 102*a* (FIG. 1) may be captured based on the detected application of the horn. The captured first sensor data indicates a first traffic scenario in a vicinity of the first vehicle 102*a*. Second sensor data associated with the first vehicle 102*a* may be extracted for an elapsed time interval prior to the application of the horn at the first vehicle. One or more control systems in the first vehicle 102*a* may be recalibrated to perform one or more functions associated with the first vehicle 102*a*. The recalibration may be based on the captured first sensor data and the extracted second sensor data.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system comprising:
one or more circuits in an electronic control unit (ECU) used in a first vehicle, said one or more circuits configured to:
detect a horn sound from a second vehicle;
capture first sensor data associated with said first vehicle based on said detected horn sound, wherein said captured first sensor data indicates a first traffic scenario in a vicinity of said first vehicle;
extract second sensor data associated with said first vehicle for an elapsed time interval prior to said detection of said horn sound; and
recalibrate at least one control system in said first vehicle based on said captured first sensor data and said extracted second sensor data, wherein said recalibrated at least one control system is configured to execute at least one function associated with said first vehicle.

2. The system according to claim 1, wherein said one or more circuits are further configured to determine a position and/or a direction of said second vehicle with respect to said first vehicle based on said captured first sensor data.

3. The system according to claim 1, wherein said first vehicle is configured to operate in one of an autonomous mode, a semi-autonomous mode, or a manual mode.

4. The system according to claim 1, wherein said second vehicle operates in one of an autonomous mode, a semi-autonomous mode, or a manual mode.

5. The system according to claim 1, wherein said at least one function corresponds to one of a change of lane, a change of speed, provision of lane change indication, maintenance of a safe distance from one or more other vehicles, application of horn, application of brakes, a change in driving path of said first vehicle, or generation of a safety alert, wherein said at least one function is executed to avoid a violation of a traffic regulation.

6. The system according to claim 1, wherein said first sensor data corresponds to at least one of a video stream of said first traffic scenario, vehicle data received from at least one connected vehicle in said vicinity of said first vehicle, or sensor data received from one of a radio wave-based object detection device or laser-based object detection device.

7. The system according to claim 1, wherein said second sensor data corresponds to at least one of a steering angle, a yaw rate, a speed value, lane information, a vehicle positional accuracy data, a brake system status, a status of a vehicle stability system, or a rate-of-change of speed of said first vehicle.

8. The system according to claim 7, wherein said one or more circuits are further configured to tag said captured first sensor data and said extracted second sensor data with metadata corresponding to said detection of said horn sound.

9. The system according to claim 8, wherein said one or more circuits are further configured to utilize said tagged first sensor data and said tagged second sensor data for said recalibration of said at least one control system of said first vehicle.

10. The system according to claim 1, wherein said one or more circuits are further configured to:
identify said first traffic scenario; and
apply a horn at said first vehicle based on said identified first traffic scenario and based on operation of said first vehicle in an autonomous mode.

11. A system comprising:
one or more circuits in an electronic control unit (ECU) used in a first vehicle, said one or more circuits configured to:
detect an application of a horn at said first vehicle;
capture first sensor data associated with said first vehicle based on said detected application of said horn, wherein said captured first sensor data indicates a first traffic scenario in a vicinity of said first vehicle;
extract second sensor data associated with said first vehicle for an elapsed time interval prior to said application of said horn at said first vehicle; and
recalibrate at least one control system in said first vehicle based on said captured first sensor data and said extracted second sensor data, wherein said recalibrated at least one control system is configured to execute at least one function associated with said first vehicle.

12. A method for controlling a first vehicle, said method comprising:
detecting, by an electronic control unit (ECU) used in said first vehicle, a horn sound from a second vehicle;
capturing, by said ECU, first sensor data associated with said first vehicle based on said detected horn sound, wherein said captured first sensor data indicates a first traffic scenario in a vicinity of said first vehicle;
extracting, by said ECU, second sensor data associated with said first vehicle for an elapsed time interval prior to said detection of said horn sound; and
recalibrating, by said ECU, at least one control system in said first vehicle based on said captured first sensor data and said extracted second sensor data, wherein said recalibrated at least one control system is configured to execute at least one function associated with said first vehicle.

13. The method according to claim 12, further comprising determining at least one of a position or a direction of said second vehicle with respect to said first vehicle based on said captured first sensor data.

14. The method according to claim 12, wherein said at least one function corresponds to one of a change of lane, a change of speed, provision of lane change indication, maintenance of a safe distance from one or more other vehicles, application of horn, application of brakes, a change in driving path of said first vehicle, or generation of a safety alert, wherein said at least one function is executed to avoid a violation of a traffic regulation.

15. The method according to claim 12, wherein said first sensor data corresponds to at least one of a video stream of said first traffic scenario, vehicle data received from at least one connected vehicle in said vicinity of said first vehicle, or sensor data received from one of a radio wave-based object detection device or laser-based object detection device.

16. The method according to claim 12, wherein said second sensor data corresponds to at least one of a steering angle, a yaw rate, a speed value, lane information, a vehicle positional accuracy data, a brake system status, a status of a vehicle stability system, or a rate-of-change of speed of said first vehicle.

17. The method according to claim 16, further comprising tagging said captured first sensor data and said extracted second sensor data with metadata corresponding to said detection of said horn sound.

18. The method according to claim 17, further comprising utilizing said tagged first sensor data and said tagged second sensor data for said recalibration of said at least one control system of said first vehicle.

19. The method according to claim 12, further comprising:
   identifying said first traffic scenario; and
   applying a horn at said first vehicle based on said identified first traffic scenario and based on operation of said first vehicle in an autonomous mode.

20. A first vehicle, comprising:
one or more sensors configured to:
   detect a horn sound from a second vehicle; and
   capture first sensor data and second sensor data associated with said first vehicle; and
one or more circuits used in an electronic control unit configured to:
   receive said captured first sensor data associated with said first vehicle based on said detected horn sound, wherein said received first sensor data indicates a first traffic situation in a vicinity of said first vehicle;
   receive said captured second sensor data associated with said first vehicle for an elapsed time interval prior to said detection of said horn sound; and
   recalibrate at least one control system in said first vehicle based on said received first sensor data and said received second sensor data, wherein said recalibrated at least one control system is configured to execute at least one function associated with said first vehicle.

* * * * *